(12) United States Patent
Caveney et al.

(10) Patent No.: US 7,408,113 B2
(45) Date of Patent: Aug. 5, 2008

(54) CORNER DUCT WITH CO-EXTRUDED HINGES

(75) Inventors: Jack E. Caveney, Hinsdale, IL (US); Jeffrey K. Groff, South Holland, IL (US); Rodney G. Rouleau, Manhattan, IL (US); Charles F. VanderVelde, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 11/621,179

(22) Filed: Jan. 9, 2007

(65) Prior Publication Data

US 2007/0163797 A1 Jul. 19, 2007

Related U.S. Application Data

(60) Provisional application No. 60/758,627, filed on Jan. 13, 2006.

(51) Int. Cl.
*H02G 3/04* (2006.01)

(52) U.S. Cl. .................. 174/68.1; 174/68.3; 174/480; 174/481; 52/220.1; 52/220.3; 52/220.7; 439/207

(58) Field of Classification Search .............. 174/480, 174/481, 68.3, 68.1, 60, 67, 95, 97, 99 R, 174/98, 72 A, 72 R, 101; 220/3.2, 3.3, 3.5, 220/3.8; 385/134, 135; 439/207, 209, 210, 439/211, 212, 213; 52/220.1, 220.3, 220.7, 52/220.8, 249

See application file for complete search history.

(56) References Cited

U.S. PATENT DOCUMENTS

| 2,921,607 | A | * | 1/1960 | Caveney | ............ 174/72 A |
| 3,229,029 | A | | 1/1966 | Weiss | |
| 3,302,350 | A | | 2/1967 | Brown et al. | |
| 3,485,937 | A | * | 12/1969 | Caveney | ............ 174/101 |
| 3,782,420 | A | | 1/1974 | Kolb et al. | |
| 3,786,171 | A | | 1/1974 | Shira | |
| 3,939,620 | A | | 2/1976 | Bero | |

(Continued)

FOREIGN PATENT DOCUMENTS

CH 609177 2/1979

(Continued)

OTHER PUBLICATIONS

Canalplast Cable Trunking Edge brochure, 6 pages, date unknown.

(Continued)

*Primary Examiner*—Angel R Estrada
(74) *Attorney, Agent, or Firm*—Robert A. McCann; Christopher S. Clancy; Aimee E. McVady

(57) ABSTRACT

The present invention is directed to a one-piece corner duct that routes wires in a corner of an enclosure. The one-piece corner duct includes a back wall and sidewalls. The back wall has at least one co-extruded hinge that enables the back wall to pivot to allow the one-piece corner duct to conform to a corner of the enclosure. The sidewalls have a plurality of fingers that retain the wires in the corner duct. The fingers also maintain a cover on the one-piece corner duct to provide access to the wires therein.

15 Claims, 23 Drawing Sheets

U.S. PATENT DOCUMENTS

| | | | |
|---|---|---|---|
| 4,463,046 A * | 7/1984 | Hutchison et al. | 428/156 |
| 4,484,020 A | 11/1984 | Lööf et al. | |
| 4,534,147 A | 8/1985 | Cristell | |
| 4,629,826 A | 12/1986 | Thomas | |
| 4,857,670 A | 8/1989 | Frank et al. | |
| 5,115,377 A * | 5/1992 | Dransman | 174/72 R |
| 5,814,767 A * | 9/1998 | Katz | 174/68.1 |
| 6,076,315 A * | 6/2000 | Cormann | 52/220.1 |
| 6,084,180 A | 7/2000 | DeBartolo, Jr. et al. | |
| 6,107,575 A | 8/2000 | Miranda | |
| 7,019,213 B1 * | 3/2006 | McNutt et al. | 174/68.1 |
| 7,119,282 B2 * | 10/2006 | Krietzman et al. | 174/101 |

FOREIGN PATENT DOCUMENTS

| | | |
|---|---|---|
| EP | 0403440 A3 | 7/1991 |
| EP | 0278923 B1 | 11/1993 |
| EP | 1054492 A1 | 11/2000 |
| EP | 1152508 B1 | 4/2005 |
| EP | 1533821 A3 | 6/2005 |
| EP | 1102375 B1 | 7/2005 |

OTHER PUBLICATIONS

Hager B&R webpage regarding LFR & LF General Purpose Trunking, 1 page, Sep. 29, 2004.

* cited by examiner

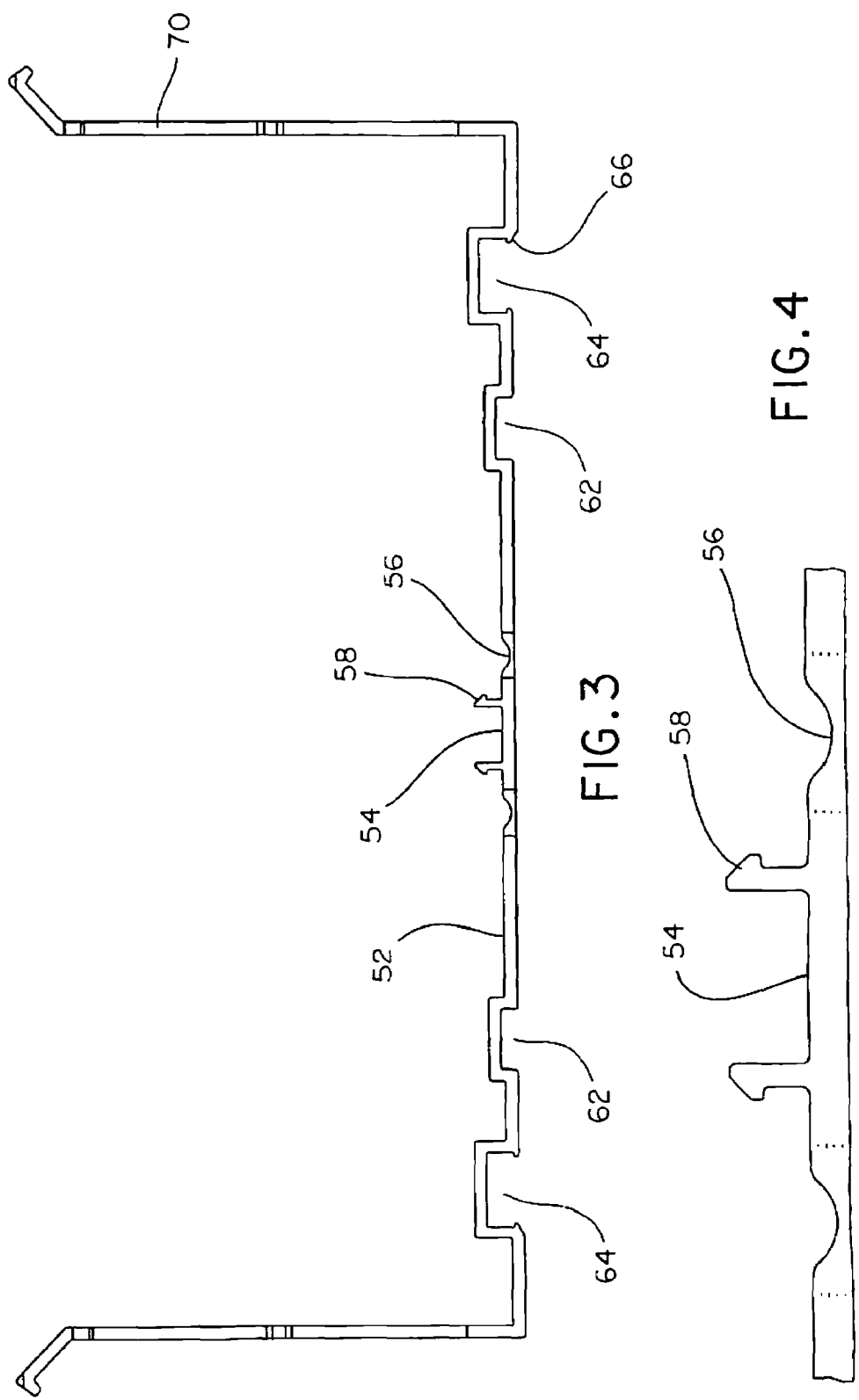

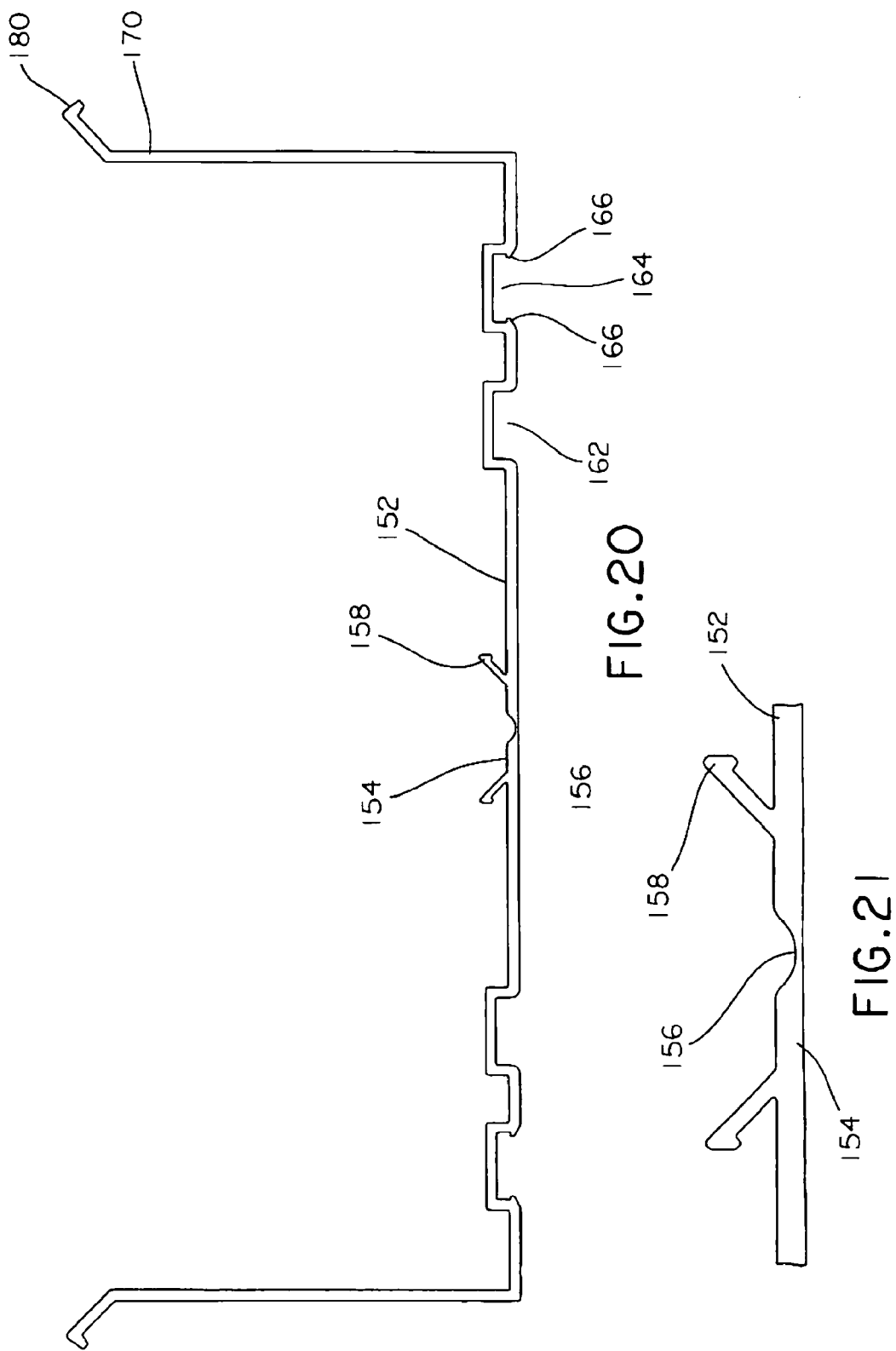

US 7,408,113 B2

CORNER DUCT WITH CO-EXTRUDED HINGES

CROSS-REFERENCE TO RELATED APPLICATION

This application claims priority from U.S. Provisional Patent Application No. 60/758,627, filed Jan. 13, 2006, the subject matter of which is hereby incorporated herein by reference in its entirety.

FIELD OF THE INVENTION

The present invention relates to a corner duct for routine wires, and more particularly to a corner duct with co-extruded hinges for routing wires along the vertical corner of a control panel enclosure.

BACKGROUND OF THE INVENTION

It is known to use a wire duct to route wires in an enclosure. Typically rectangular ducts are used to route wires inside the enclosure. Rectangular ducts, however, are fastened to the panels of the enclosure without abutting the corner of the panels of the enclosure. As a result, internal space behind the duct is wasted. Angled wire ducts have also been used to route wires in an enclosure. The prior angled wire ducts are formed from multiple pieces and require end user assembly where each piece is individually mounted to the enclosure to form a corner wire duct.

Thus, it would be desirable to provide a one-piece corner where duct that is easy to install and is designed to efficiently use the internal space in the enclosure to route wires.

SUMMARY

The present invention is directed toward a one-piece corner duct used to route wires in an enclosure. The one-piece corner duct includes a back wall and sidewalls. The back wall has at least one co-extruded hinge. The co-extruded hinge enables the back wall to pivot to allow the one-piece corner duct to conform to a corner of the enclosure. The sidewalls have a plurality of fingers. The fingers retain the wires in the one-piece corner duct. The fingers also maintain the cover that is installed over the one-piece corner duct to cover the wires and to provide access to the wires positioned therein.

BRIEF DESCRIPTION OF THE DRAWINGS

FIG. 3 illustrates an end view of the corner duct of FIG. 2;

FIG. 4 illustrates an end view of the double co-extruded hinge of the corner duct of FIG. 2;

FIG. 20 illustrates an end view of the corner duct of FIG. 19;

FIG. 21 illustrates an end view of the single co-extruded hinge of the corner duct of FIG. 20;

DETAILED DESCRIPTION

Figure 1:
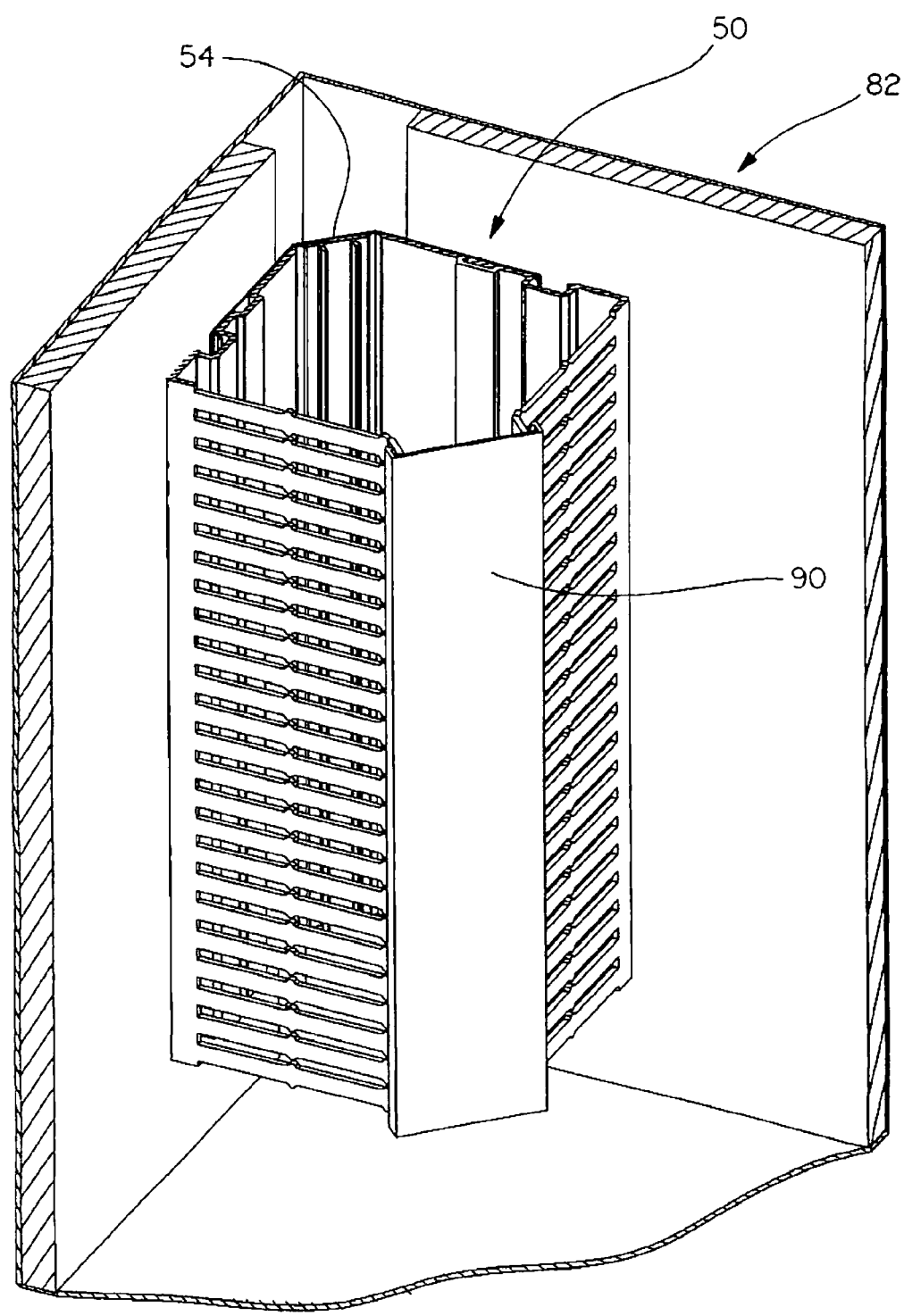
FIG. 1 illustrates a perspective view of the corner duct of the present invention with a double co-extruded hinge.

FIGS. 1-17 illustrate a one-piece corner duct 50 of the present invention with a double co-extruded hinge 54. As shown in FIG. 1, the corner duct 50 is positioned in the corner of an enclosure 82. A removable cover 90 is attached to the corner duct 50 to provide easy access to the wires routed therein. As discussed below, the corner duct 50 is mounted to the enclosure 82 by a mounting device, such as mounting clips 100 (see FIGS. 5-7 and 9-11), fasteners 69 (see FIGS. 10-11), mounting rails 120 (see FIGS. 12-14) or mounting discs 140 (see FIGS. 15-17). Although mounting clips, fasteners, mounting rails and mounting discs are illustrated, it is contemplated that other mounting devices may also be used.

Figure 2:
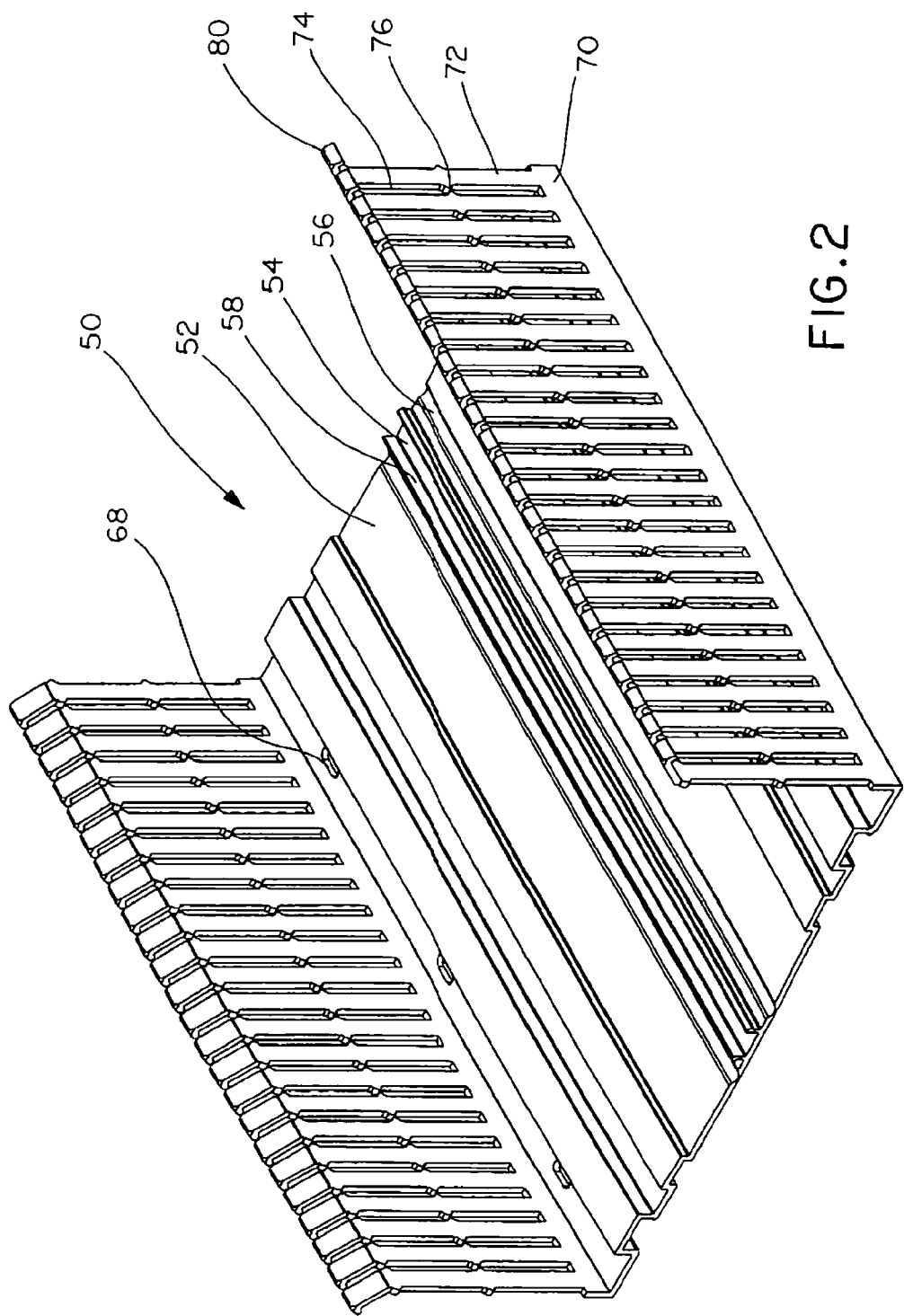
FIG. 2 illustrates a perspective view of the corner duct of FIG. 1 in a pre-installed configuration.

FIGS. 2-4 illustrate the corner duct 50 in a pre-installed extruded configuration. The corner duct 50 is a one-piece extruded duct with a back wall 52 and sidewalls 70. The corner duct is extruded as one piece in an "open" state.

Figure 8:
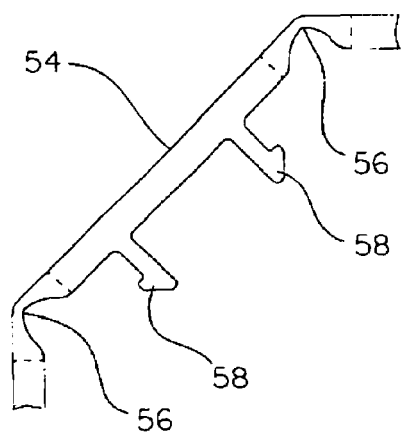
FIG. 8 illustrates a top view of the double co-extruded hinge of the corner duct of FIG. 1.

As show in FIGS. 1-8, 10-12 and 15, the back wall 52 of the corner duct 50 includes a double co-extruded hinge 54. FIGS. 4 and 8 illustrate the double co-extruded hinge 54 in detail. The double hinge 54 includes two living hinges 56 that allow the back wall 52 to pivot to enable the corner duct 50 to be installed at the corner of an enclosure 82. Thus, the double hinge 54 enables the back wall 52 and the sidewalls 70 to conform to the perpendicular back panel 84 and the side panel 86 of the enclosure 82 (see FIG. 10). The double hinge 54 also includes two latches 58 for securing a divider wall (not illustrated) in the corner duct, if desired.

The sidewalls 70 of the corner duct 50 include a plurality of fingers 72. The fingers 72 are angled slightly outward to provide a pre-load that maintains the cover 90 on the duct 50. Each finger 72 includes a double restricted slot 74 designed with a detent nub 76. The detent nub 76 retains the wires in the slot 74 in several positions along the finger 72. Each finger 72 also includes score-lines (not illustrated) to enable the fingers 72 to be removed from the duct 50, if desired. A flange 80 is located at the free end of each finger 72. The flanges 80 engage the flanges 96 of the removable cover 90 when installed on the corner duct 50.

As shown in FIG. 3, the back wall 52 of the corner duct also includes a plurality of pockets 62, 64. The pockets 62, 64 are located in the back wall 52 on each side of the double co-extruded hinge 54. As described below, the pockets 62, 64 are sized to receive a variety of mounting devices that may be used to secure the corner duct 50 to the enclosure 82.

Figure 5:
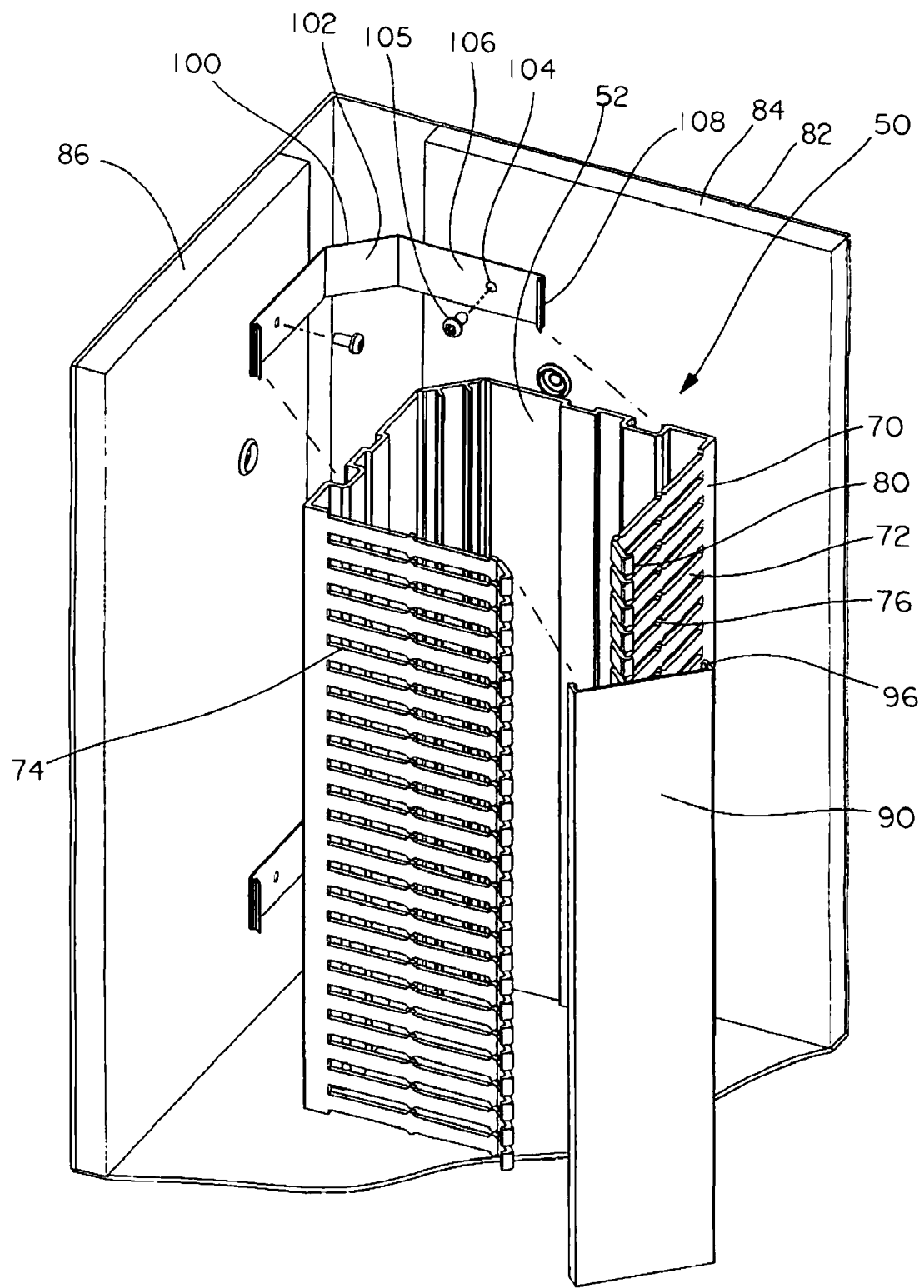
FIG. 5 illustrates an exploded view of the corner duct of FIG. 1 with a mounting clip secured to a back panel and a side panel of an enclosure.
Figure 6:
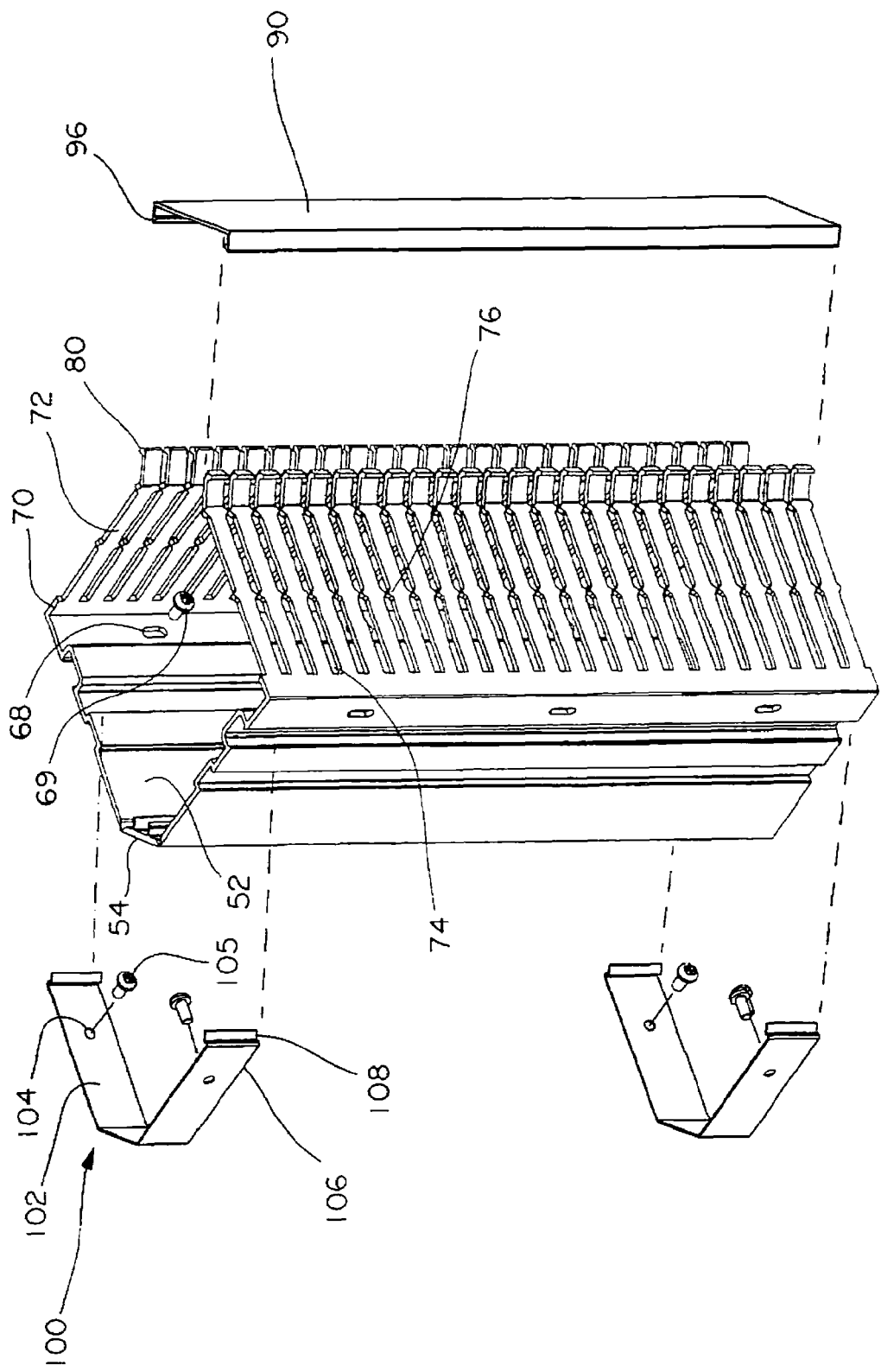
FIG. 6 illustrates an exploded view of the corner duct of FIG. 1 with a mounting clip and a cover.
Figure 7:
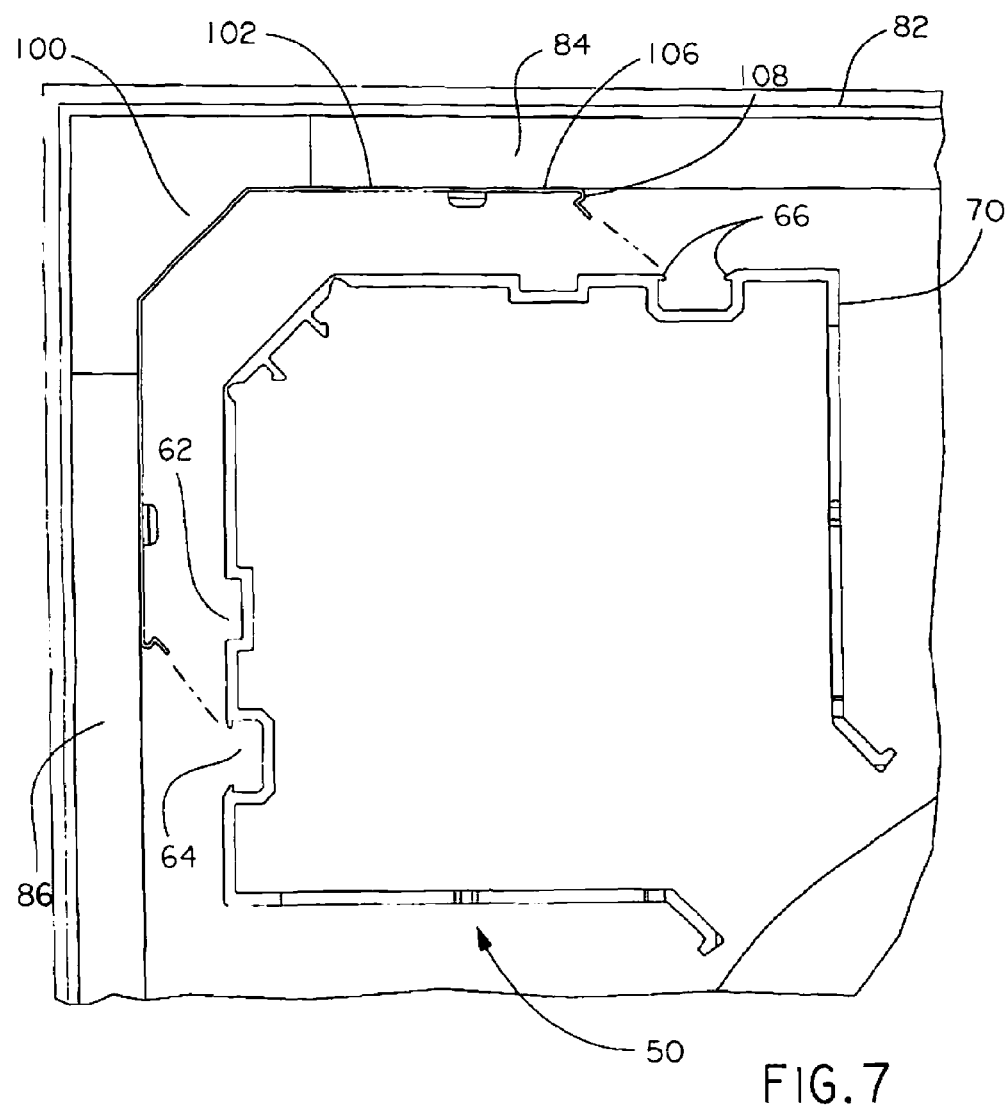
FIG. 7 illustrates a top view of the corner duct of FIG. 5 to be mounted to the mounting clip secured to the enclosure.

As shown in FIG. 5, the mounting clips 100 are secured to the back panel 84 and the side panel 86 of the enclosure 82. The mounting clips 100 include a body 102, holes 104 for receiving fasteners 105 and two ends 106. Each end includes a flange 108 that engages the corner duct when the corner duct is mounted to the mounting clips.

Figure 9:
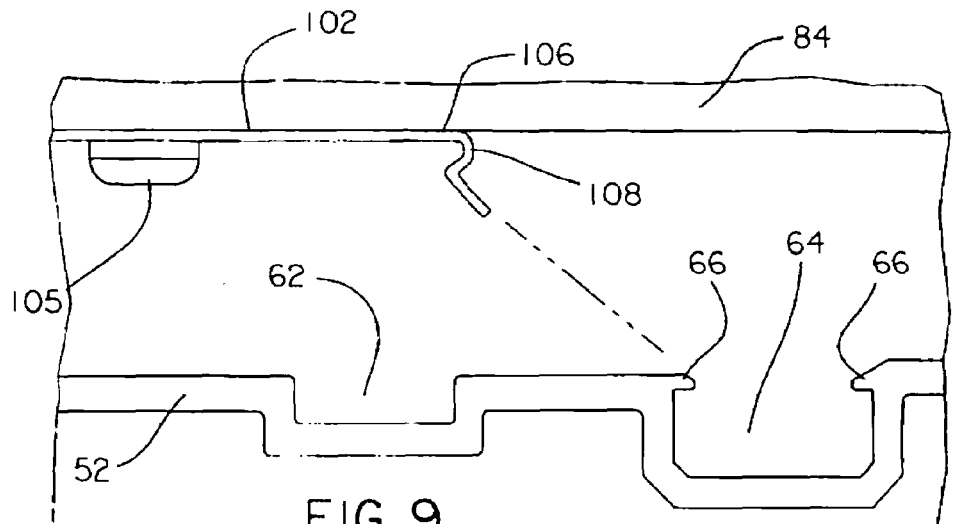
FIG. 9 illustrates a top view of the mounting clip to be installed in the pockets of the corner duct of FIG. 1.
Figure 10:
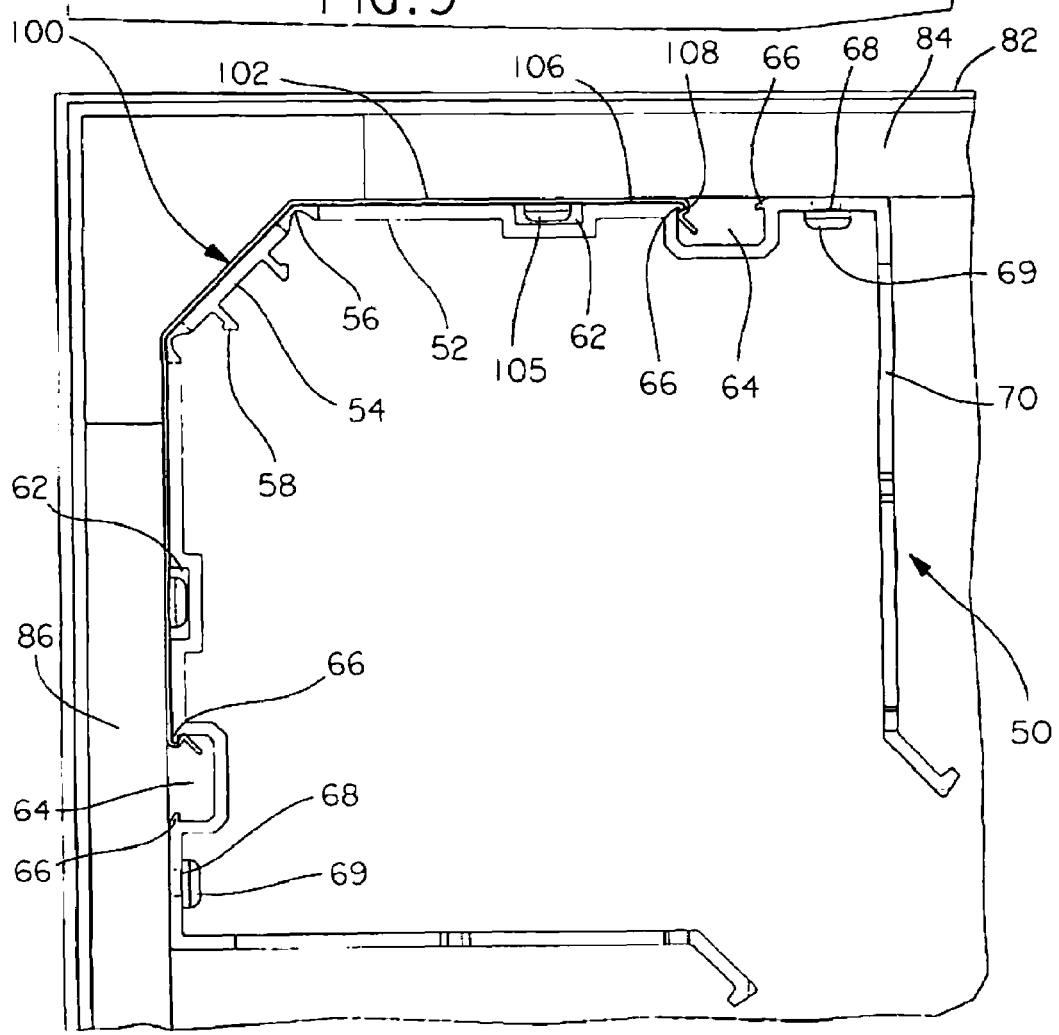
FIG. 10 illustrates a top view of the corner duct of FIG. 1 mounted to the mounting clip.
Figure 11:
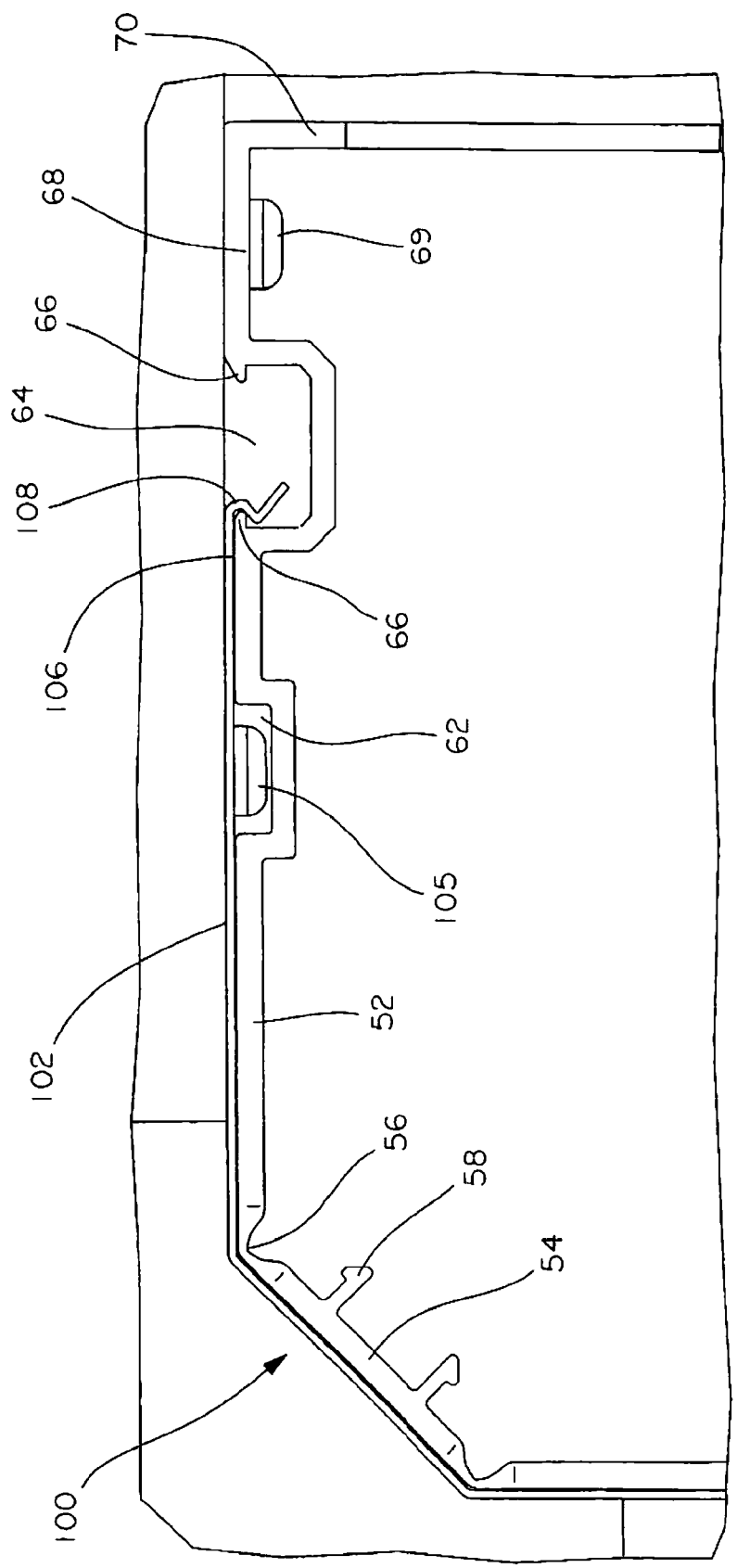
FIG. 11 illustrates a top view of the double co-extruded hinge and the corner duct of FIG. 1 mounted to the mounting clip.

As illustrated in FIGS. 9-11, the first pocket 62 in the back wall 52 is designed to house the fastener 105 that secures the mounting clip 100 to the enclosure. The second pocket 64 is designed to house at least a portion of the mounting device. More specifically, the second pocket 64 includes at least one inward projection 66 that engages the portion of the mounting device to secure the corner duct to the mounting device. As illustrated in FIGS. 10 and 11, the projection 66 engages the flange 108 at the end 106 of the mounting clip 100 to secure the duct to the mounting clip.

The back wall 52 also includes a plurality of mounting holes 68 located near the sidewalls 70. When the duct is positioned against the back panel 84 and side panel 86 of the enclosure 82, a fastener 69, such as machine screws or nylon rivets, can be installed in each mounting hole 68 to secure the corner duct 50 to the enclosure 82. Thus, in addition to the mounting clip 100, the corner duct 50 may be secured to the enclosure via the fastener 69 through the mounting hole 68. Alternatively, the corner duct 50 may be mounted to the enclosure 82 solely by a plurality of fasteners 69.

Figure 12:
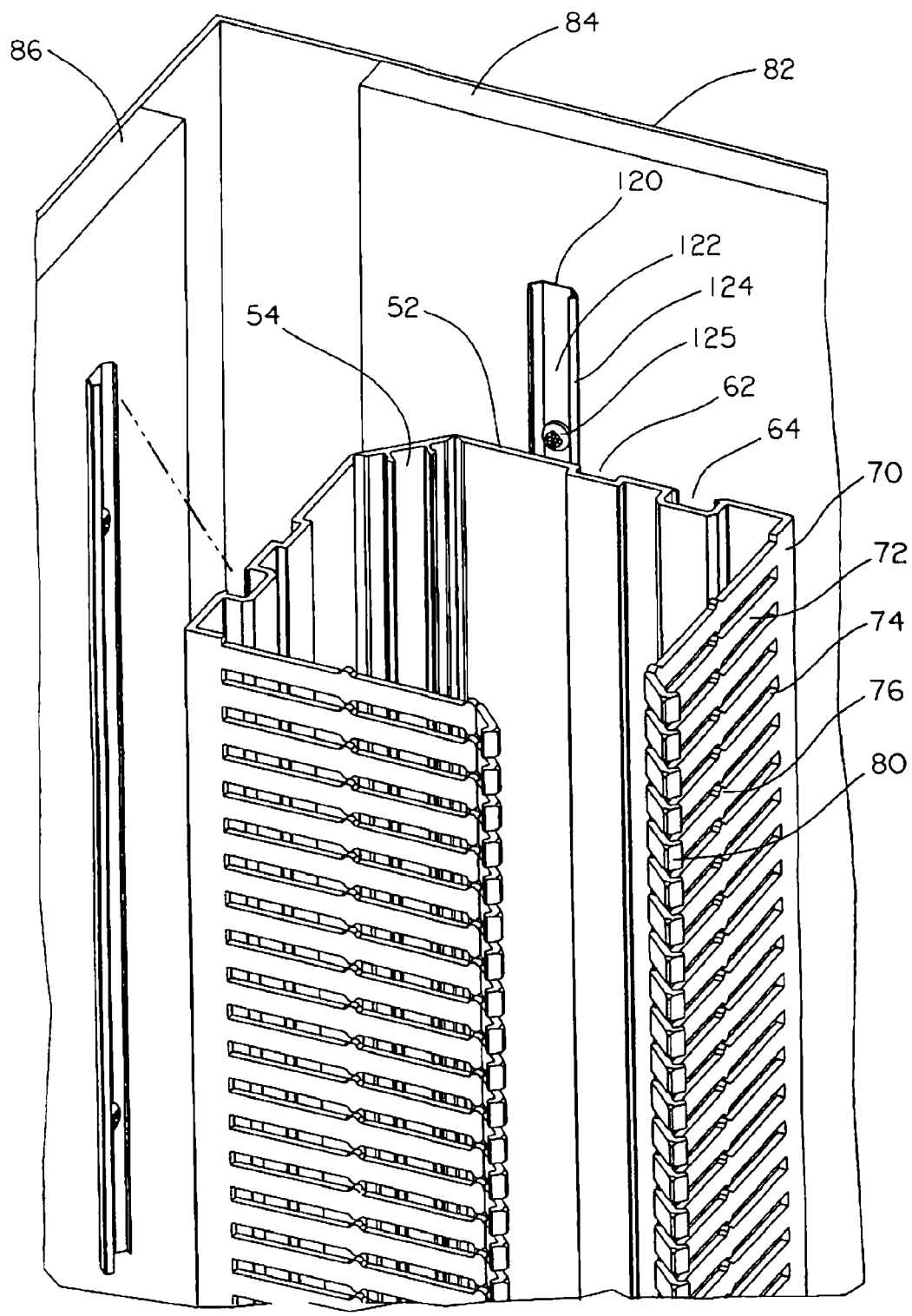
FIG. 12 illustrates a perspective view of the corner duct of FIG. 1 to be mounted to the enclosure by mounting rails.
Figure 13:
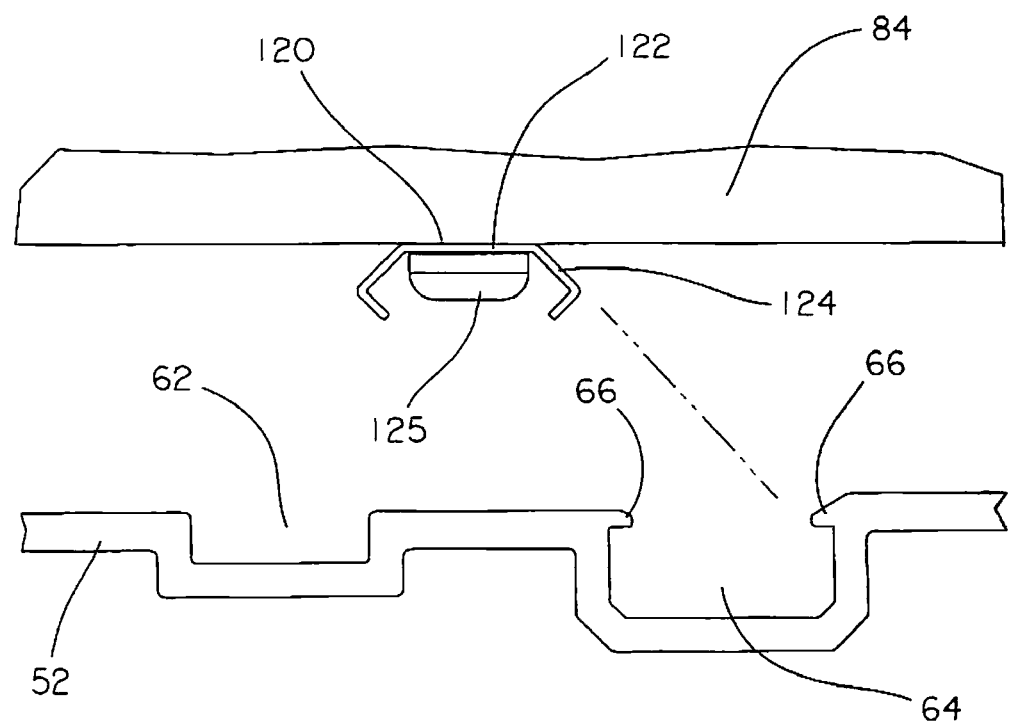
FIG. 13 illustrates a top view of a portion of the corner duct of FIG. 12 to be mounted to one of the mounting rails.
Figure 14:
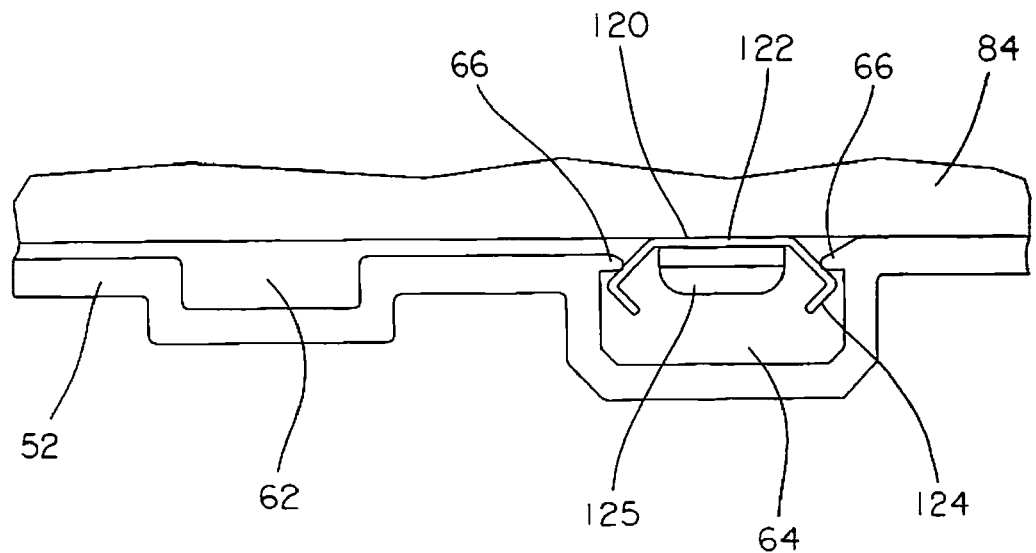
FIG. 14 illustrates a top view of a portion of the corner duct of FIG. 12 mounted to one of the mounting rails.

FIGS. 12-14 illustrate mounting rails 120, one of the alternative mounting devices, to secure the corner duct to the enclosure. The mounting rails 120 include a body 122 with inwardly extending flanges 124 that is secured to the back panel 84 and the side panel 86 of the enclosure 82 by fasteners 125. The corner duct is mounted to the mounting rails by positioning the mounting rail within the second pockets 64 on the back wall 52 of the corner duct. The protrusions 66 of the second pocket 64 engage the mounting rail 120 to secure the corner duct 50 to the mounting rail 120 and the enclosure 82.

Figure 15:
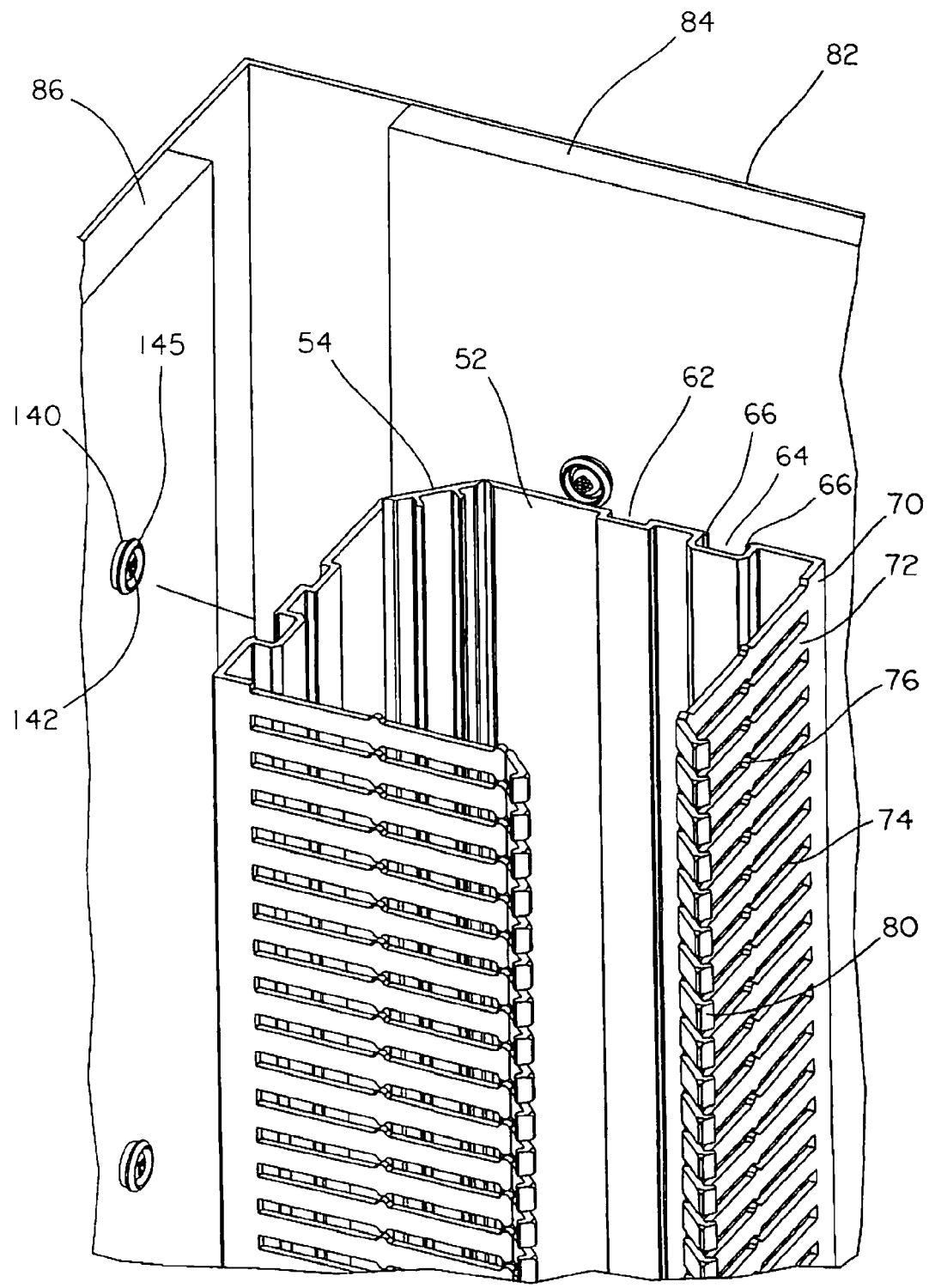
FIG. 15 illustrates a perspective view of the corner duct of FIG. 1 to be mounted to the enclosure by mounting discs.
Figure 16:
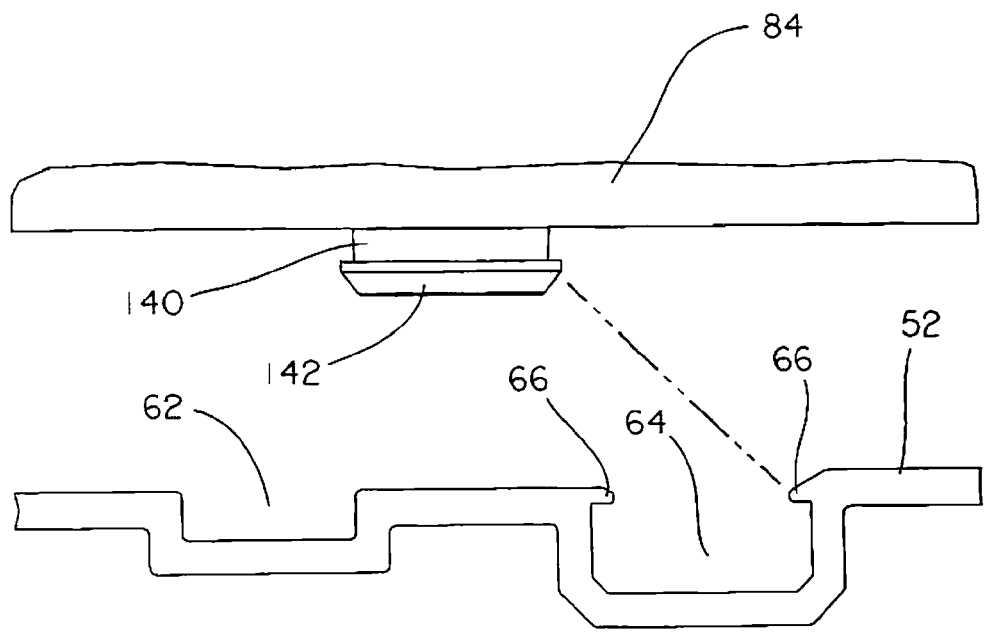
FIG. 16 illustrates a top view of a portion of the corner duct of FIG. 15 to be mounted to one of the mounting discs.
Figure 17:
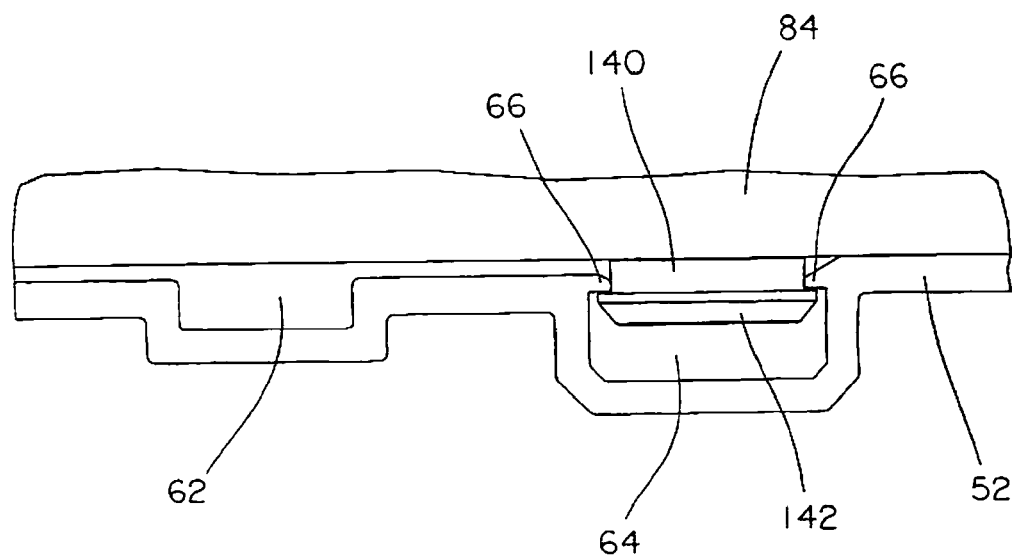
FIG. 17 illustrates a top view of a portion of the corner duct of FIG. 15 mounted to one of the mounting discs.
Figure 18:
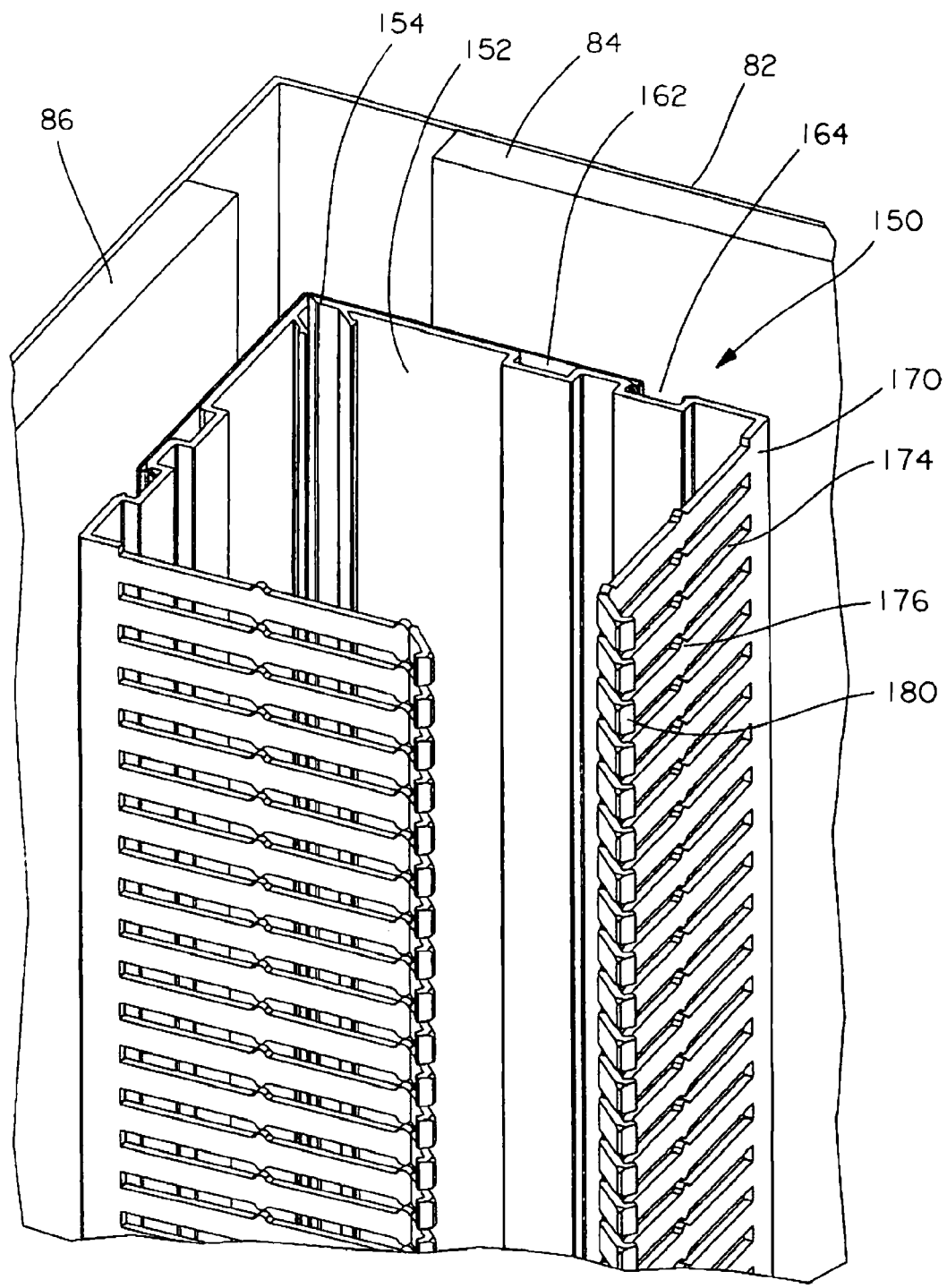
FIG. 18 illustrates a perspective view of an alternative corner duct of the present invention with a single co-extruded hinge.
Figure 19:
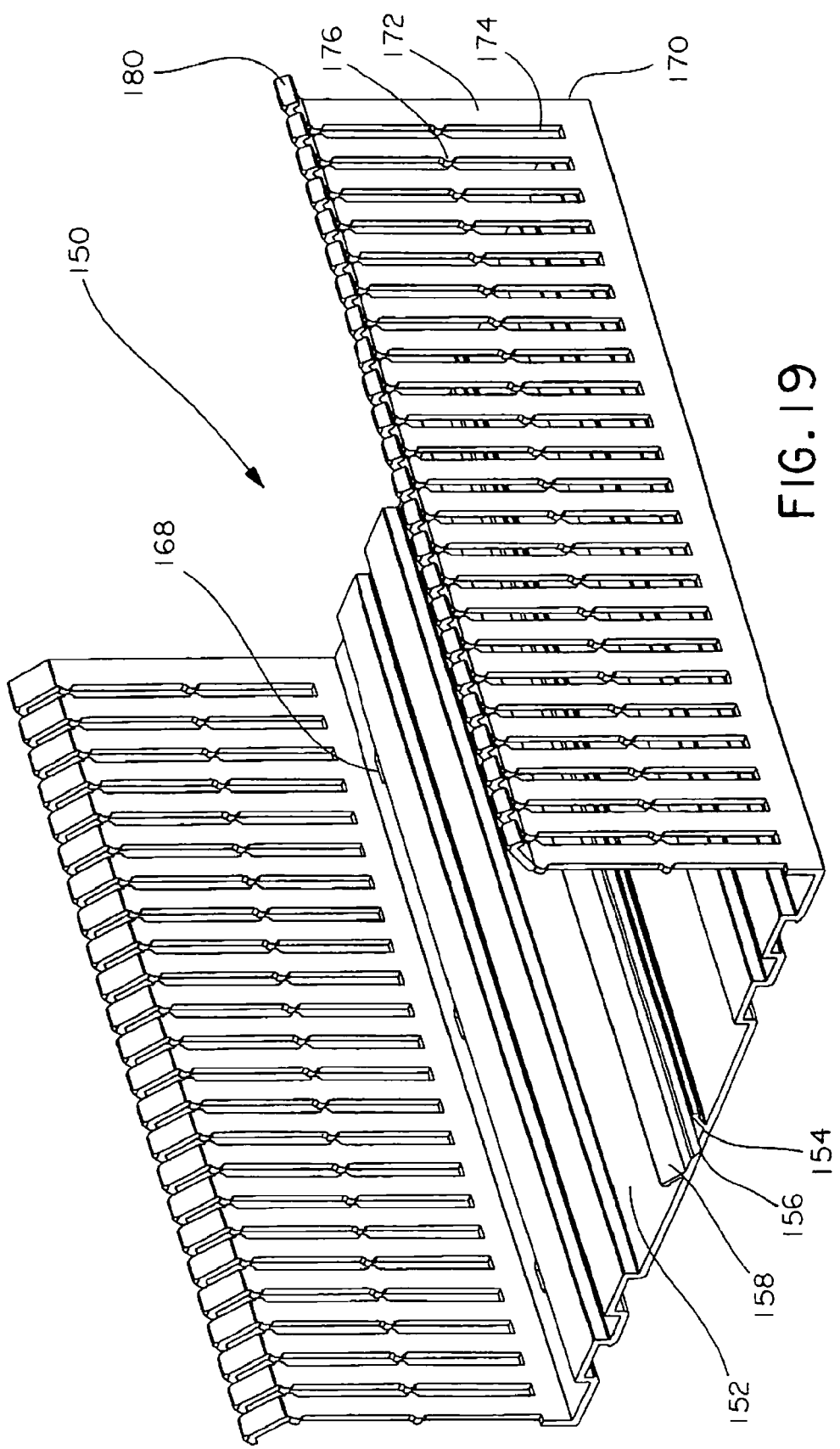
FIG. 19 illustrates a perspective view of the corner duct of FIG. 18 in a pre-installed configuration.

FIGS. 15-17 illustrate mounting discs 140, one of the alternative mounting devices, to secure the corner duct to the enclosure. The mounting discs 140 are positioned a spaced distance apart along the back panel 84 and the side panel 86 of the enclosure 82. The mounting discs 140 include a circular lip 142 and a hole for receiving a fastener 145 to secure the mounting disc 140 to the enclosure. The corner duct is mounted to the mounting discs by positioning the mounting discs within the second pockets 64 of the back wall 52 of the corner duct 50. The protrusions 66 of the second pocket 64 engage the underside of the circular lip 142 to secure the corner duct 50 to the mounting disc 140 and the enclosure 82.

FIGS. 18-23 illustrate an alternative corner duct 150 of the present invention with a single co-extruded hinge 154. The corner duct 150 is similar to the corner duct 50 illustrated in FIGS. 1-17 except for the single co-extruded hinge 154. The single co-extruded hinge 154 includes one living hinge 156 and two latches 158 for securing a divider wall (not illustrated) in the corner duct, if desired.

Figure 22:
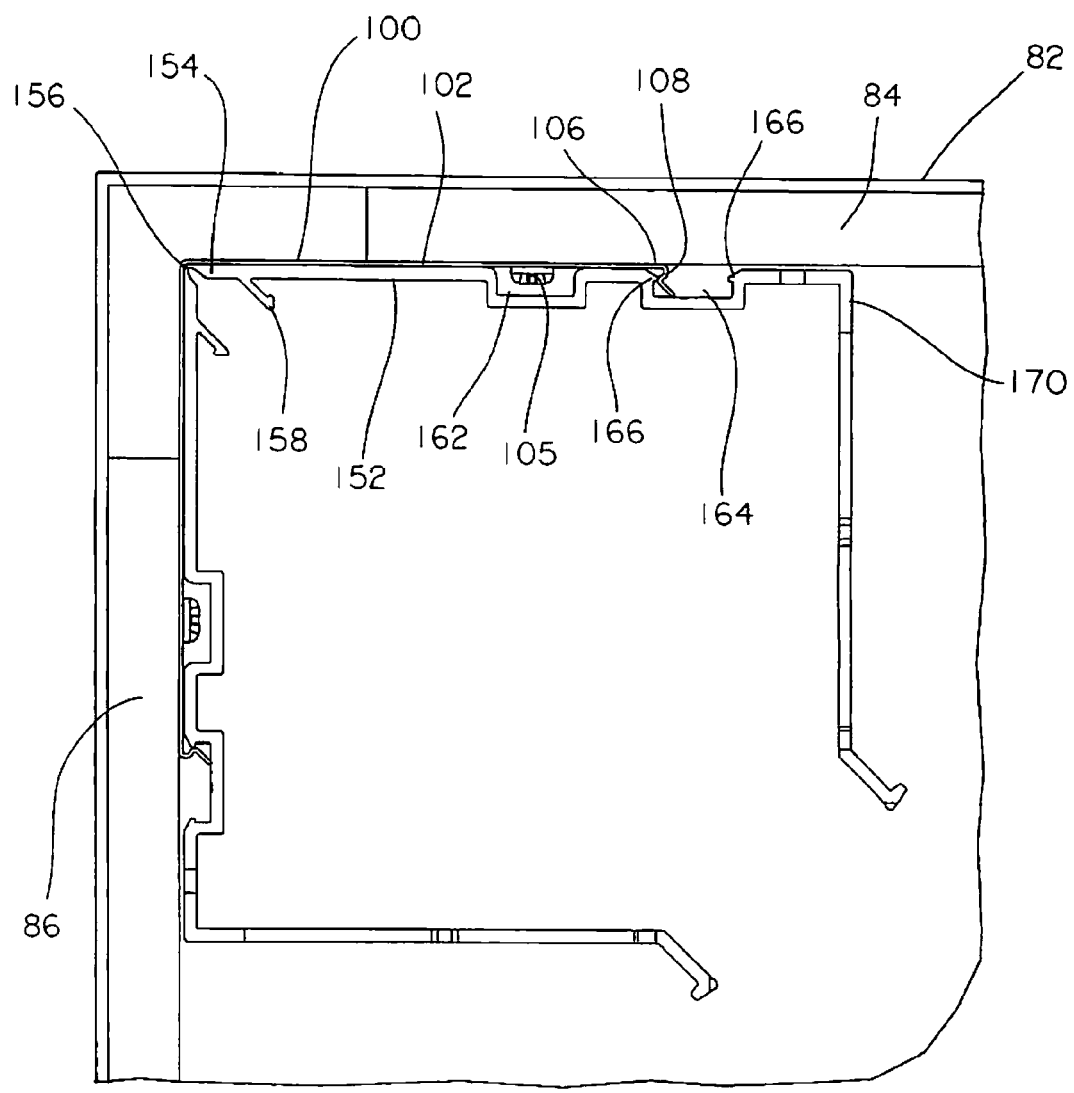
FIG. 22 illustrates a top view of the corner duct of FIG. 18 mounted to a mounting clip.
Figure 23:
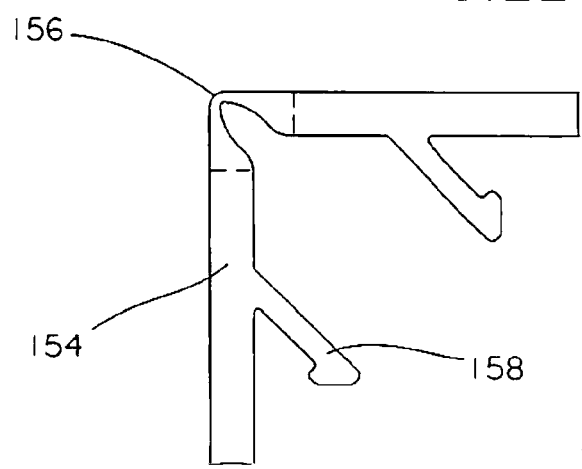
FIG. 23 illustrates a top view of the single co-extruded hinge of the corner duct of FIG. 18.

As with the double co-extruded hinge, the single co-extruded hinge enables the duct to be extruded as one piece. The living hinge 156 enables the back wall 152 of the corner duct 150 to pivot. Thus, the co-extruded hinge 154 can be positioned at the corner of the enclosure to enable the corner duct 150 to be positioned flush against the corner of the enclosure. As a result, a portion of the back wall 152 of the duct would be positioned against the back panel 84 and the side panel 86 of the enclosure 82, as illustrated in FIG. 22. The pockets 162, 164 in the back wall 152 are positioned to receive the mounting device, such as mounting clips, to secure the corner duct to the enclosure. Although only the mounting clip is illustrated, the corner duct with the single co-extruded hinge could also be mounted to the enclosure by the mounting rails, the mounting discs or by fasteners through holes as illustrated and described above with respect to the double co-extruded hinge.

FIGS. 24-35 illustrate an alternative molded corner duct of the present invention with hinged sidewalls. As illustrated in FIGS. 25, 29, 30, 32 and 33 the corner duct 250 includes a back wall 252 and hinging sidewalls 270. When the corner duct 250 is positioned in the corner of an enclosure 82, the hinges 300 along the sidewalls 270 allow the sidewalls 270 to pivot inward to conform to the perpendicular back panel 84 and the side panel 86 of the enclosure 82.

Figure 24:
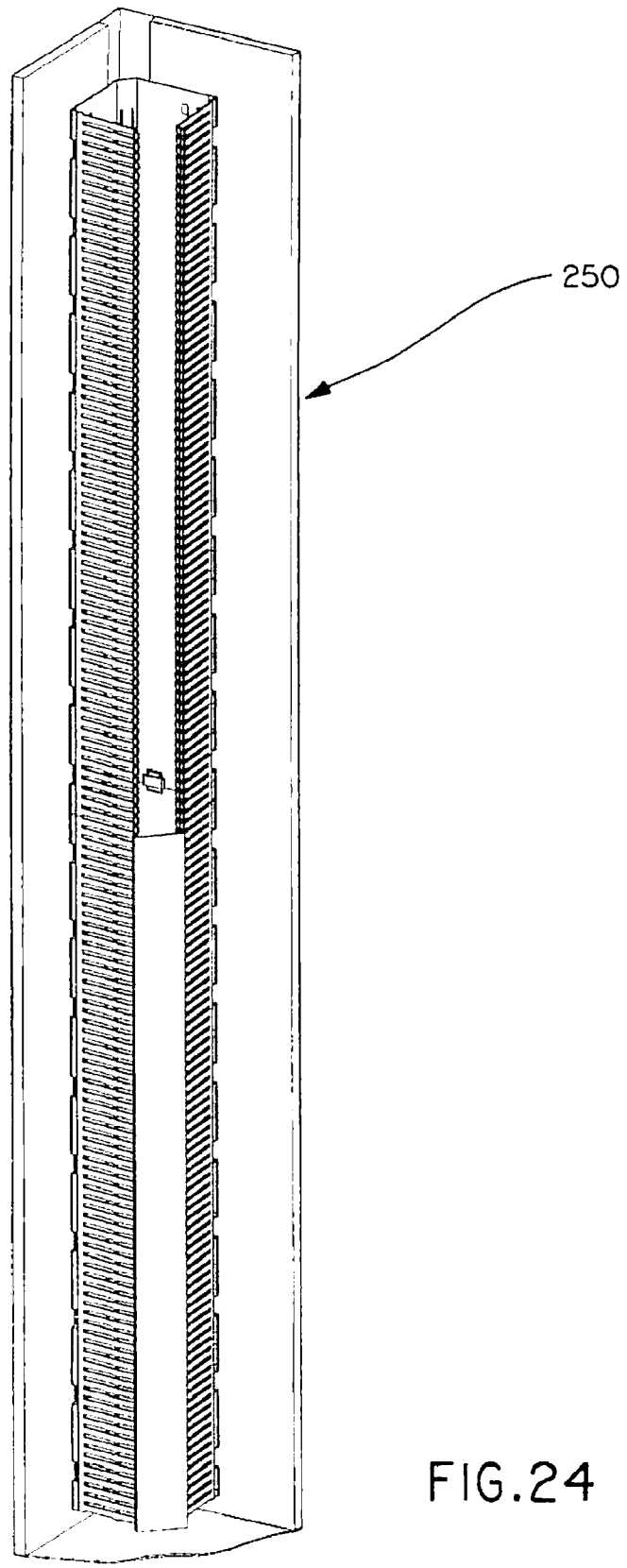
FIG. 24 illustrates a perspective view of an alternative molded corner duct of the present invention with hinging sidewalls mounted to an enclosure.
Figure 25:
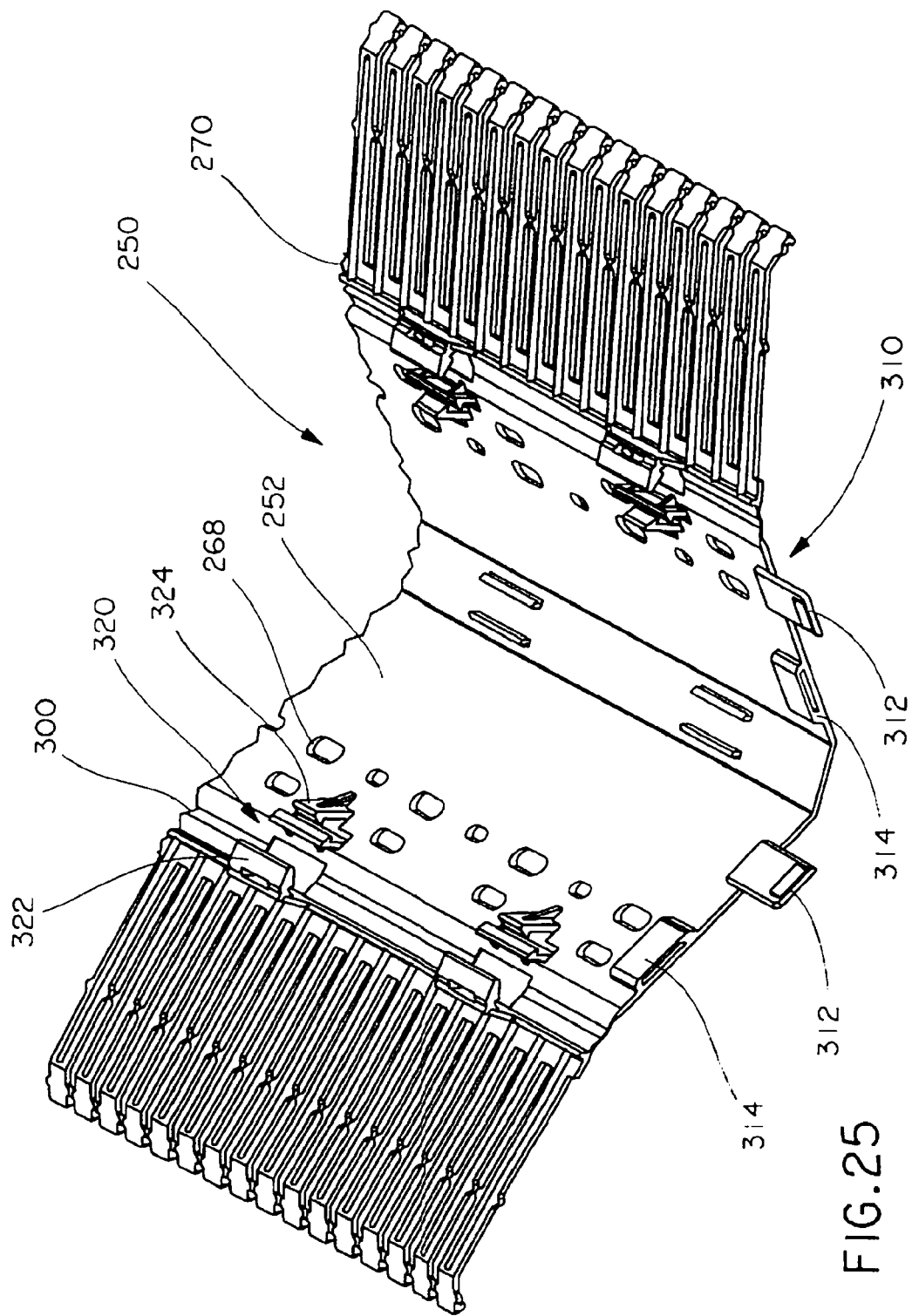
FIG. 25 illustrates a perspective view of the corner duct of FIG. 24 in a pre-installed configuration.
Figure 26:
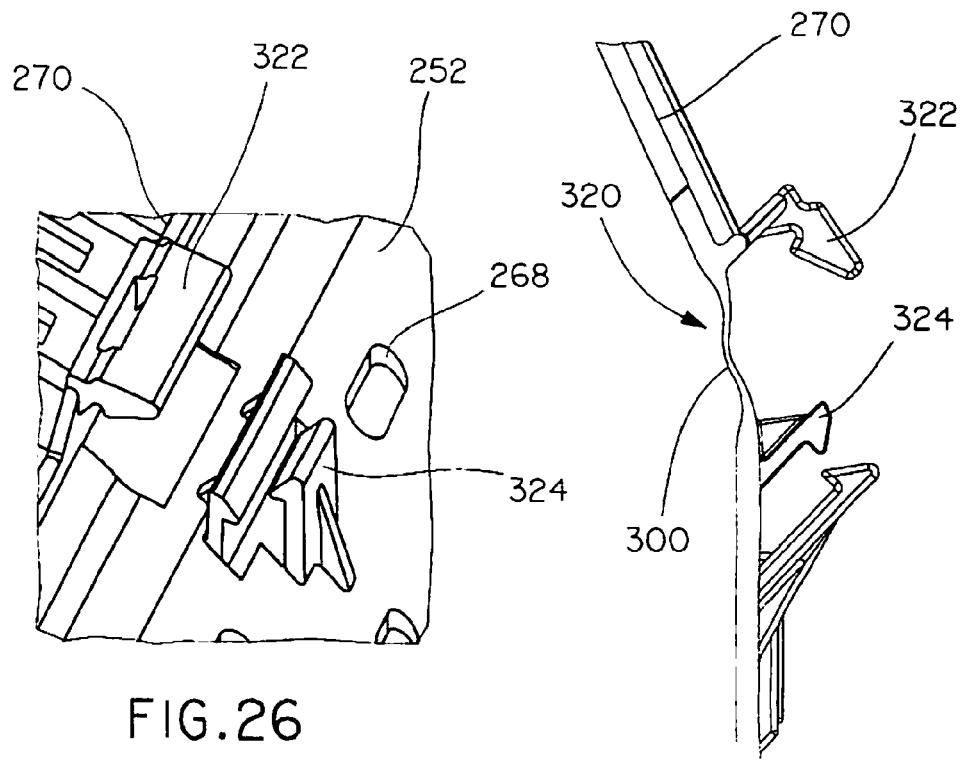
FIG. 26 illustrates a perspective view of the disengaged latch mechanism of the corner duct of FIG. 25.
Figure 27:
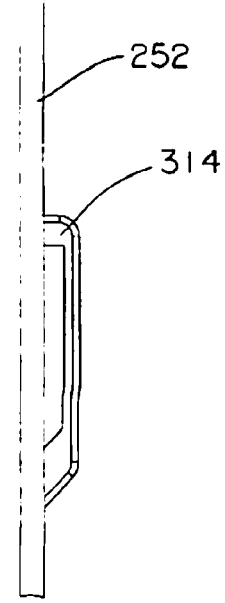
FIG. 27 illustrates an end view of the latch mechanism of FIG. 25.
Figure 28:
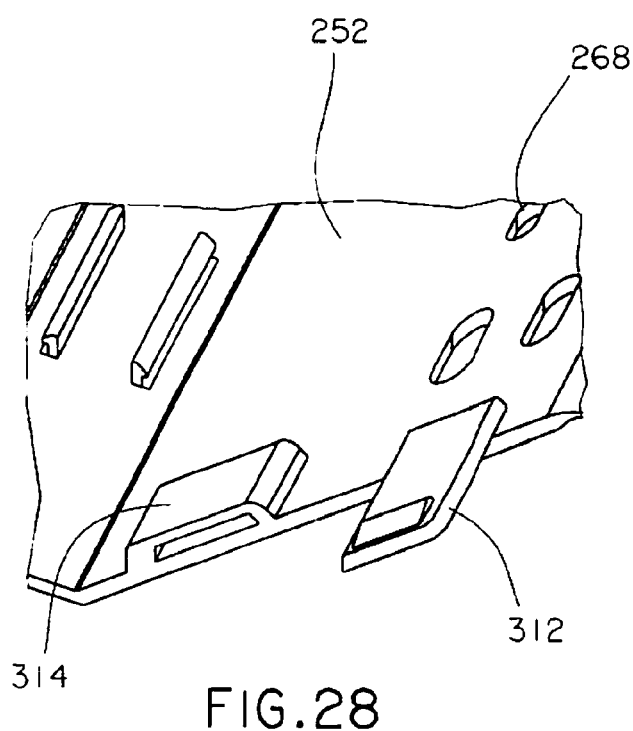
FIG. 28 illustrates a perspective view of the snap-fit mechanism of the corner duct of FIG. 25.
Figure 29:
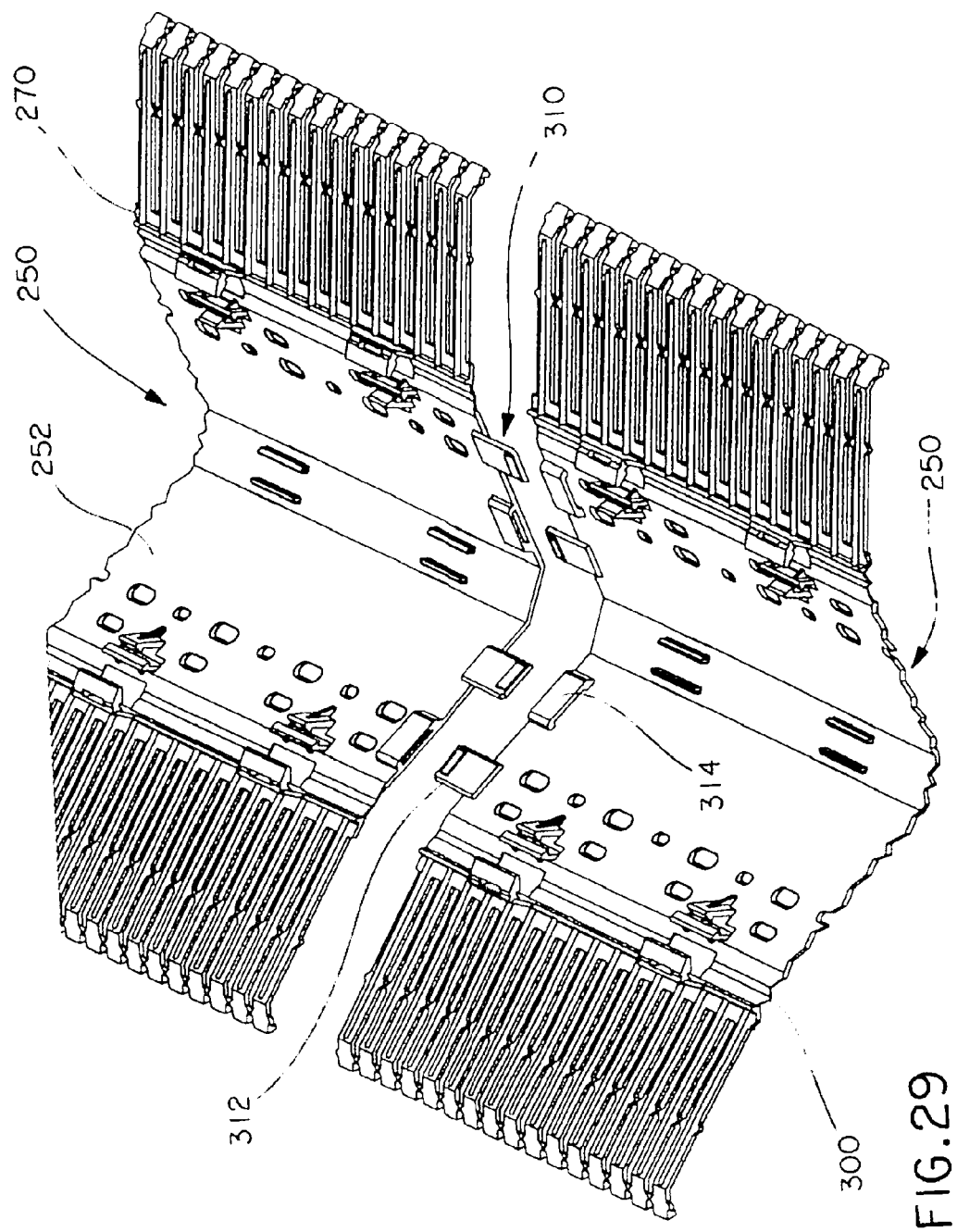
FIG. 29 illustrates a perspective view of the corner duct of FIG. 25 to be assembled to a second corner duct.
Figure 30:
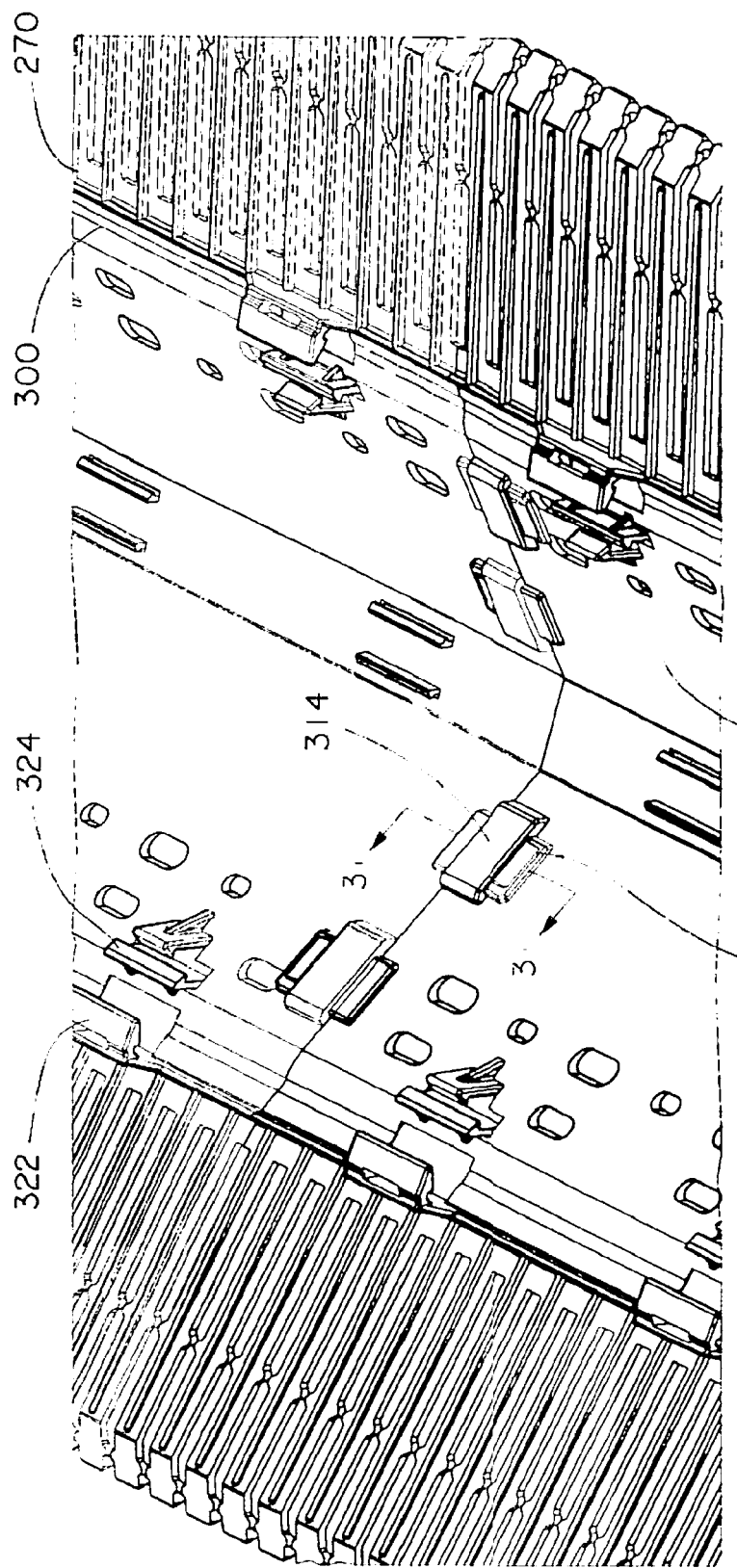
FIG. 30 illustrates a perspective view of the corner ducts of FIG. 29 assembled to each other.
Figure 31:
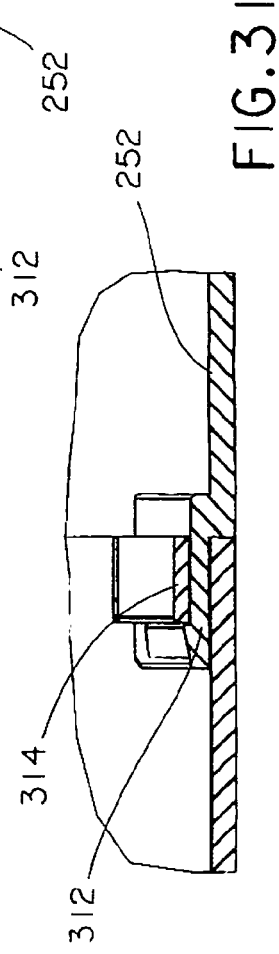
FIG. 31 illustrates a cross section of the snap-fit mechanism taken along the line 31-31 of FIG. 30.
Figure 32:
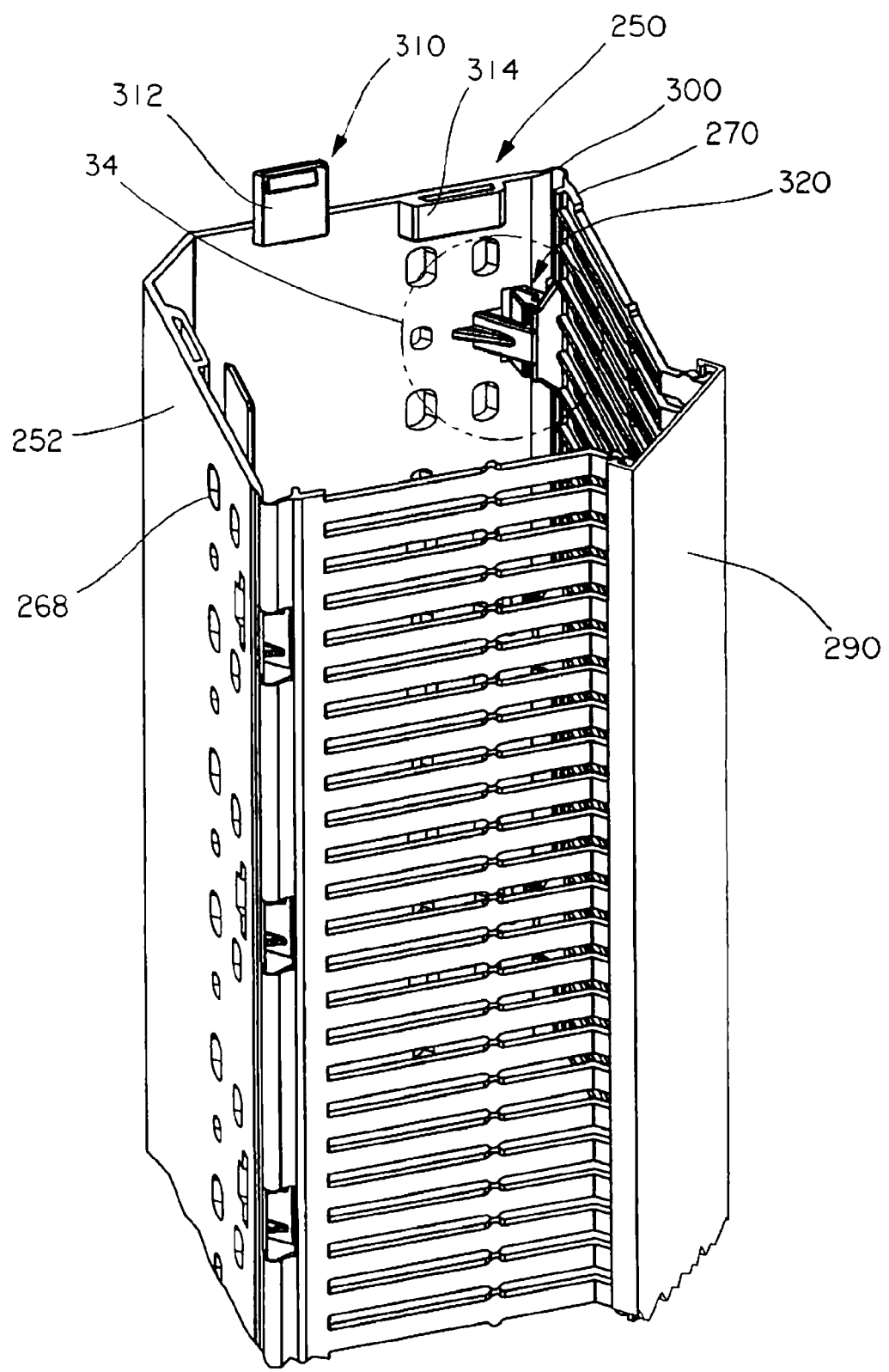
FIG. 32 illustrates a perspective view of the corner duct of FIG. 24.
Figure 33:
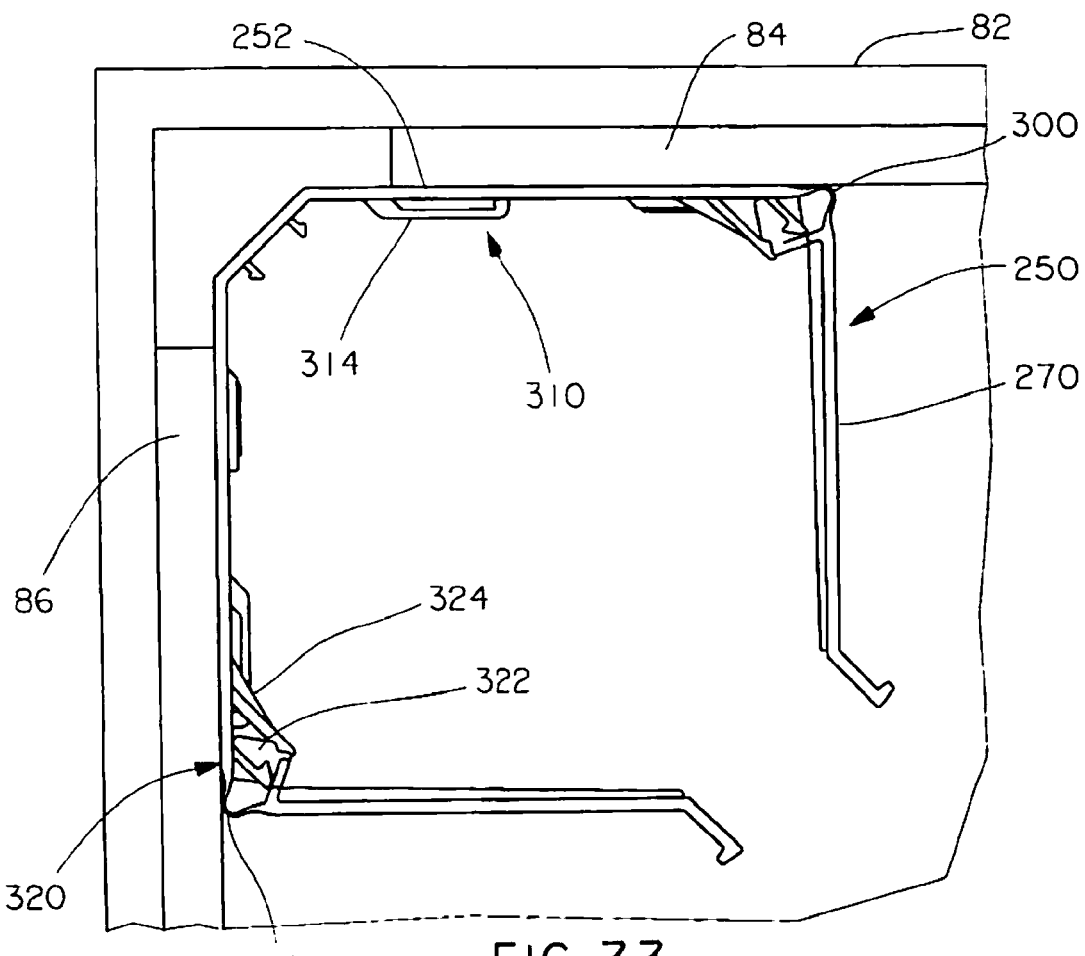
FIG. 33 illustrates a top view of the corner duct of FIG. 24 mounted to the enclosure.
Figures 34, 35:
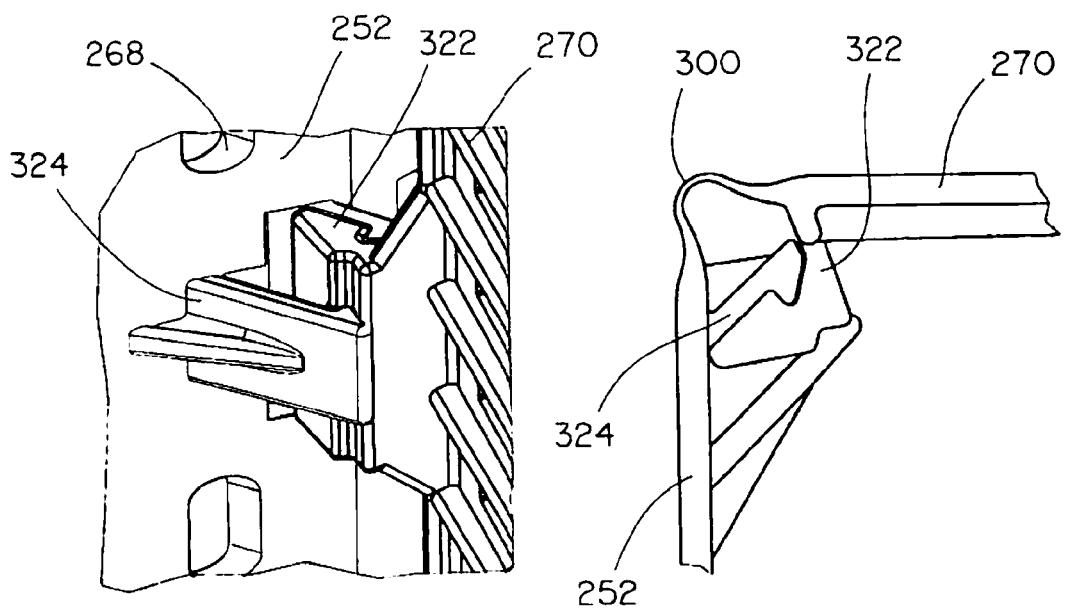
FIG. 34 illustrates a perspective view of the engaged latch mechanism of the corner duct of FIG. 24.
FIG. 35 illustrates a top view of the engaged latch mechanism of the corner duct of FIG. 24.

As illustrated in FIGS. 25-31, the top of the back wall 252 includes snap-fit mechanisms 310. Each snap-fit mechanism 310 includes a male member 312 and a female member 314. The snap-fit mechanisms 310 enable the corner duct 250 to be attached to a second identical corner duct 250 as illustrated in FIGS. 24, 29 and 30. As a result, multiple corner ducts may be positioned to route wiring in the enclosure.

As illustrated in FIGS. 32-35, a plurality of latch mechanisms 320 are positioned on either side of the hinges 300. Each latch mechanism 320 includes a male member 322 and a female member 324. The male members 322 are positioned on the sidewall 270 and the female members 324 are positioned on the back wall 252. When the sidewalls 270 pivot, the male member 322 also pivots until it engages the female member 324 on the back wall 252. The latch mechanisms 320 enable the sidewalls 270 to lock in the installed position to form the corner duct 250.

The corner duct 250 is attached to the back panel 84 and the side panel 86 of the enclosure 82 by fasteners (not illustrated), such as machine screws or nylon rivets, through the mounting holes 268 in the back wall 252 of the corner duct 250.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A one-piece corner duct for routing wires in an enclosure, the one-piece corner duct comprising:
   a back wall with a base, a first portion hingedly connected to the base and a second portion hingedly connected to the base, the second portion opposite the first portion; and
   wherein the first portion includes a first sidewall with first fingers and the second portion includes a second sidewall with second fingers, whereby the first portion and the second portion pivot to allow the one-piece corner duct to conform to a corner of the enclosure.

2. The one-piece corner duct of claim 1, wherein the back wall includes a plurality of pockets for receiving a mounting device that mounts the one-piece corner duct to the enclosure.

3. The one-piece corner duct of claim 1, wherein the back wall includes latches for receiving a divider wall.

4. The one-piece corner duct of claim 3, wherein the back wall includes one co-extruded hinge positioned between the latches.

5. The one-piece corner duct of claim 3, wherein the back wall includes two co-extruded hinges positioned adjacent the latches.

6. The one-piece corner duct of claim 1, wherein the fingers are angled for providing a pre-load that maintains a cover installed over the one-piece corner duct.

7. The one-piece corner duct of claim 1, wherein the fingers include a double restricted slot with a detent nub for retaining the wires in the one-piece corner duct.

8. A one-piece corner duct and a mounting device assembly for routing wires in an enclosure, the assembly comprising:
   a one-piece corner duct including a back wall and sidewalls, the back wall having a first end, a second end, at least one co-extruded hinge and a plurality of pockets that extend from the first end to the second end; and
   a mounting device positioned in at least one of the pockets in the back wall of the one-piece corner duct for mounting the one-piece corner duct to the enclosure.

9. The assembly of claim 8, wherein the mounting device includes a mounting clip.

10. The assembly of claim 8, wherein the mounting device includes mounting rails.

11. The assembly of claim 8, wherein the mounting device includes mounting discs.

12. The assembly of claim 8, wherein the mounting device includes fasteners.

13. A one-piece corner duct for routing wires in an enclosure, the one-piece corner duct comprising:
   a back wall with a base, a first portion integral with the base and a second portion integral with the base, the second portion opposite the first portion;
   a first sidewall hingedly connected to the first portion, wherein the first sidewall includes first fingers; and
   a second sidewall hingedly connected to the second portion, wherein the second sidewall includes second fingers,
   whereby the first sidewall and the second sidewall pivot to allow the one-piece corner duct to conform to a corner of the enclosure.

14. The one-piece corner duct of claim 13,
   wherein the first portion and the second portion having a plurality of first latch members; and
   the first sidewall and the second sidewall having a plurality of second latch members,
   whereby the first latch members and the second latch members cooperate to lock the side walls.

15. The one-piece corner duct of claim 13, further comprising a snap-fit mechanism for joining adjacent one-piece corner ducts.

* * * * *